US012139613B2

(12) United States Patent
Le et al.

(10) Patent No.: US 12,139,613 B2
(45) Date of Patent: Nov. 12, 2024

(54) ASPHALT MIXTURE COMPOSITION COMPRISING DIGESTATE ADDITIVE

(71) Applicant: Renescience A/S, Fredericia (DK)

(72) Inventors: Duy Michael Le, Veksø Sj (DK); Linda Kaare Nørskov, Søborg (DK)

(73) Assignee: Renescience A/S, Fredericia (DK)

( * ) Notice: Subject to any disclaimer, the term of this patent is extended or adjusted under 35 U.S.C. 154(b) by 915 days.

(21) Appl. No.: 17/255,260

(22) PCT Filed: Jun. 21, 2019

(86) PCT No.: PCT/EP2019/066481
§ 371 (c)(1),
(2) Date: Dec. 22, 2020

(87) PCT Pub. No.: WO2020/002153
PCT Pub. Date: Jan. 2, 2020

(65) Prior Publication Data
US 2021/0171775 A1 Jun. 10, 2021

(30) Foreign Application Priority Data
Jun. 26, 2018 (EP) .................................. 18179742

(51) Int. Cl.
C08L 95/00 (2006.01)
C02F 3/28 (2023.01)
(Continued)

(52) U.S. Cl.
CPC ............... C08L 95/00 (2013.01); C02F 3/28 (2013.01); C02F 11/04 (2013.01); C02F 11/12 (2013.01);
(Continued)

(58) Field of Classification Search
CPC ............ C08L 95/00; C02F 3/28; C02F 11/04; C02F 11/12
See application file for complete search history.

(56) References Cited

FOREIGN PATENT DOCUMENTS

CA 2890430 A1 11/2015
CA 3006226 A1 6/2017
(Continued)

OTHER PUBLICATIONS

Anonymous, "Digestate Factsheet: the value of organic fertilisers for Europe's economy, society and environment, the products of anaerobic digestion," European Biogas Association, http://european-biogas.eu/wp-content/uploads/2015/07/Digestate-paper-final-08072015.pdf, 2015, pp. 1-4.
(Continued)

Primary Examiner — Ling Siu Choi
Assistant Examiner — Andrea Wu
(74) Attorney, Agent, or Firm — McNeill PLLC

(57) ABSTRACT

The present invention relates to asphalt mixture compositions, suitable for building roads, pavements and paved areas, roofing, vehicle parking areas, house-drives, footways, recreation areas such as tennis courts or playgrounds, agricultural uses such as farm roads or animal cubicles, airfields, runways and access roads, hard standings, storage areas, hydraulic applications such as dam construction, coastal protection and other. The present invention also concerns a method of providing such compositions and various uses thereof. In particular, this invention concerns the replacement of, at least a part of, a binder or a binder composition comprised by said asphalt mixture composition, said binder or binder composition preferably being bitumen or polymer modified bitumen, with digestate additive and one or more further component(s), such as aggregate(s), additive(s) and/or filler(s).

11 Claims, 6 Drawing Sheets

(51) Int. Cl.
    *C02F 11/04*     (2006.01)
    *C02F 11/12*     (2019.01)
    *C08K 11/00*     (2006.01)

(52) U.S. Cl.
    CPC ......... *C08K 11/005* (2013.01); *C08L 2555/24* (2013.01); *C08L 2555/26* (2013.01); *C08L 2555/28* (2013.01); *C08L 2555/34* (2013.01)

(56) References Cited

FOREIGN PATENT DOCUMENTS

| | | |
|---|---|---|
| CN | 104531234 A | 4/2015 |
| CN | 107532004 A | 1/2018 |
| WO | WO 2016/170082 A1 | 10/2016 |
| WO | WO 2017/088892 A1 | 6/2017 |

OTHER PUBLICATIONS

Anonymous, "Bituminous mixtures—Material specifications—Part 1: Asphalt Concrete," European Standard, 2006, pp. 1-41.

Anonymous, "Inbicon Biomass Refinery, Cellulosic Ethanol Technology Platforms, Growth and Sustainability through Biomass Refining, CPH," Technology Review, 2012, pp. 1-40.

Anonymous, "PAS 110:2010, Specification for whole digestate, separate liquor and separated fibre derived from the anaerobic digestion of source-segregated biodegradable materials," http://www.wrap.org.uk/sites/files/wrap/PAS110_vis_10.pdf, 2012, pp. 1-60.

Bergsma, Geert, "Review of screening LCA by DTU about the REnescience process in the Netherlands," 2015, pp. 1-11.

"Desk top study on digestate enhancement and treatment—Enhancement and treatment of digestates from anaerobic digestion," Pell Frischmann Consultants, Ltd., 2012, pp. 1-122.

"Digestate," *Wikipedia*, https://en.wikipedia.org/wiki/Digestate, 2018, pp. 1-3.

Durekovic, A., et anon., "The performance of bitumen mastics with the addition of fly ash," *Bituminous Mixtures & Pavements VI*, 2015, Nikolaides (Ed.), Taylor & Francis Group, London, pp. 1-8.

European Search Report for Application No. EP 18179742.4, 2018, pp. 1-23.

Ghazawi, Z., et al., "Pollution Reduction and Reuse of Sludge Waste in Asphalt Paving Mixtures," *Advances in Environmental and Agricultural Science*, 2015, pp. 395-399.

Hassan, Hossam F., "Recycling of municipal solid waste incinerator ash in hot-mix asphalt concrete," *Construction and Building Materials*, 2005, vol. 19(2), pp. 91-98.

Jaspers, Diederik, "Technical review of the REnescience process for CURE Afvalbeheer in the Netherlands," draft report, 2015, pp. 1-34.

Judyck, J., et al., "Field investigation of low-temperature cracking and stiffness moduli on selected roads with conventional and high modulus asphalt concrete," IOP Conf. Series: Materials Science and Engineering, 2017, vol. 236.

Pellinen, T., et anon., "Final Report FHWA/IN/JTRP-2005/20 Stiffness of Hot Mix Asphalt," School of Civil Engineering, Purdue University, Joint Transportation Research Program, 2006, pp. 1-404.

Peplow, Mark, "Enzymes offer waste-to-energy solution," *Science*, 2017, vol. 355(6332), pp. 1360-1361.

Sato, Y., et al., "Applicability of sewage sludge ash (SSA) for paving materials: A study on using SSA as filler for asphalt mixture and base course material," Third International Conference on Sustainable Construction Materials and Technologies, http://claisse.info/2013%papers/data/e283.pdf, 2013, pp. 1-10.

Tahami, S., et al., "Usage of two biomass ashes as filler in hot mix asphalt," *Construction and Building Materials*, 2018, vol. 170, pp. 547-556.

"User Guidelines for Waste and By-Product Materials in Pavement Construction," http://isddc.dot.gov/OLPFiles/FHWA/009686.pdf, 1998, 1-733.

Xie, S., et al., "Lignin as Renewable and Superior Asphalt Binder Modifier," *ACS Sustainable Chem. Eng.*, 2017, vol. 5(4), pp. 2817-2823.

ASPHALT MIXTURE COMPOSITION COMPRISING DIGESTATE ADDITIVE

CROSS-REFERENCE TO RELATED APPLICATIONS

This application is a national stage filing under 35 U.S.C. 371 of PCT/EP2019/066481 filed Jun. 21, 2019, which International Application was published by the International Bureau in English on Jan. 2, 2020, and application claims priority from European Patent Application No. 18179742.4, filed Jun. 26, 2018, which applications are hereby incorporated in their entirety by reference in this application.

FIELD OF THE INVENTION

The present invention relates to asphalt mixture compositions, suitable e.g. for building roads, pavements and paved areas, roofing, vehicle parking areas, house-drives, footways, recreation areas such as tennis courts or playgrounds, agricultural uses such as farm roads or animal cubicles, airfields, runways and access roads, hard standings, storage areas, hydraulic applications such as dam construction, coastal protection and other. The present invention also concerns a method of providing such compositions and various uses thereof. In particular, this invention concerns the replacement of, at least a part of, a binder or a binder composition comprised by said asphalt mixture composition, said binder or binder composition preferably being bitumen or polymer modified bitumen, with digestate additive. The asphalt mixture composition can further comprise one or more further component(s), such as aggregate(s), additive(s) and, optionally, filler(s).

BACKGROUND OF THE INVENTION

Every year many roads are damaged by heavy traffic and weather. These are two main factors that cause the emergence of cracks on the road surface. Heavy traffic causes surface cracking due to fatigue of the material by a great number of shear loadings of the pavement surface by the tire, aging of bituminous materials plays an important role here, too; and weather causes the thermal cracking due to for example tensile stresses caused by temperature changes.

Usually governments of many countries dedicate large amounts of money to support and guarantee reparation actions over roads depending on the characteristics of damage. There are five main types of asphalt pavement recycling: full depth reclamation, hot in-place recycling, cold in-place recycling, cold planning, and hot recycling.

Deteriorating roads are a constant problem for cities and countries. That is why engineers and public works officials are turning to a process called full-depth reclamation (FDR) with cement. It is an in-situ process that grinds up the existing asphalt pavement and aggregate base course and mixes both together and replaces it back on the subgrade soil. With FDR, typically all the pavement section and in some cases a predetermined amount of underlying material, are mixed with asphalt emulsion to produce a stabilized base course. Base problems can be corrected with this construction.

Currently most of the roads globally are paved with bitumen. Today the world's demand for bitumen accounts for more than 100 million tons per year. The viscosity of bitumen is similar to that of cold molasses while the material obtained from the fractional distillation of crude oil boiling at 525° C. is sometimes referred to as "refined bitumen".

Asphalt paving is also widely used in airports around the world. Due to the sturdiness and ability to be repaired quickly, it is widely used for runways dedicated to aircraft landing and taking off.

For a general overview of the state of the art concerning bitumen and asphalt, including any compositions comprising bitumen, provision of such compositions, as well as uses and applications, standards, definitions and the like, reference is e.g. made to "The Shell Bitumen Handbook, $6^{th}$ edition (SHB #6; ISBN 978-0-7277-5837-8), which is herewith incorporated in its entirety.

The chemistry of bitumen is very complex and the properties of produced bitumen are closely related to the crude oil sources and the refinery processes. By selecting appropriate crude oil and/or proper refinery processes, desired bitumen properties can be obtained. However, there are limits to the properties of bitumen, thereby influencing some properties of an asphalt mixture composition comprising said bitumen, e.g. resistance to rutting and cracking of road surfaces, abrasion stability, suitability to weather and climatic conditions etc.

To obtain asphalt with enhanced quality, an increasing number of investigations also began to focus on bitumen modification. Bituminous materials are typically very poor in workability when used as paving material, adhesive or waterproofing material, owing to their extremely high adhesiveness. Therefore, bituminous materials are often used after their flowabilities are enhanced by a means such as heating (i.e., heat melting process), treatment to be in the form of emulsion by using a proper emulsifying agent and water, and dissolution in a suitable solvent, for securing a desirable workability.

The asphalt mixture composition of the present invention can e.g. be used for the construction of paving of a road. The so-called emulsion breaking is caused by the evaporation and elimination of aqueous components in the composition, after the execution of a road by using an asphalt mixture composition. Thus, the asphalt is hardened to complete the construction of paving of a road.

As earlier described, the asphalt mixture composition of the present invention can also be used in asphalt roofing. The temperature interval from when the straight (run) bitumen is fluidic to when it is hard and crisp is rather small, which can be problematic, since it should be able to avoid damage despite harsh and changing weather. The temperature interval can be increased (especially towards higher temperatures) by oxidation of bitumen. This can be done by blowing hot air through the bitumen e.g. at a temperature about 250° C. To achieve a larger temperature interval towards lower temperatures, a suitably soft bitumen can be chosen to start with, or soft bitumen or bitumen oil can be added after the oxidation.

Most asphalt roofing has bitumen layers with a certain amount of added mineral filler. The filler addition improves the quality of the asphalt roofing and provides e.g. an arming effect, since the softening point is increased and/or decreasing the risk of cracking. The mineral filler can stabilize the bitumen, since it binds part of the bitumen oils, which could otherwise evaporate and make the bitumen harder. Furthermore, the filler can decrease the effect from UV-light, thus the bitumen decomposes at a lower rate. The addition of filler may also decrease the flammability of bitumen, and thus increase the asphalt roofing's resistance towards fly fire.

One or more of the following advantages and/or effects, in particular, but not exclusively, are hereby provided, when binder compositions, e.g., bitumen compositions, comprise digestate additive and/or when an asphalt mixture composition comprises digestate:

(i) increased environmental friendliness,
(ii) improved $CO_2$ footprint,
(iii) reduced need for chemicals, such as plasticity modifying agents,
(iv) reduced foaming, thus e.g. no or reduced need for anti-foaming agents,
(v) higher degree of digestate in the binder, e.g. bitumen, compositions,
(vi) cost reduction, as digestate is less expensive than e.g. SBS (styrene-butadiene-styrene) or other polymers or components that can, at least in part, be replaced or substituted with less expensive digestate,
(vii) reduction or prevention of oxidation, e.g. during mixing of the binder, e.g. bitumen in the presence of digestate, and/or of e.g. air and/or oxygen exposed surfaces,
(viii) improved UV resistance due to presence of digestate,
(ix) increased life-expectancy (longevity) of the binder compositions, e.g. bitumen compositions, roads, pavements, asphalt roofings, waterproofings, adhesives, or any constructions comprising a binder composition, e.g. a bitumen composition, as disclosed herein,
(x) increased penetration resistance, and/or
(xi) increased softening point, when e.g. compared to similar and/or comparable binder compositions and/or asphalt mixture compositions not comprising digestate.

Paving

Paving units typically need to be heated prior to commencing the paving operation to prevent the asphalt mixture composition from sticking to sensitive parts of the machine. On modern pavers, the compacting systems in the screed can be actuated separately. Particularly the high compaction screeds achieve very good compaction. As a result, the rollers behind the paver require fewer passes to achieve the specified final degree of compaction.

Compacting

Compaction of an asphalt mixture composition becomes more effective with increasing temperature. The most advantageous temperature range depends on the composition of the asphalt mixture composition, the thickness of the pavement and the type of binder used. When paving a standard asphalt mixture composition, the temperature should usually remain above 110° C., in order to ensure sufficient time for compaction.

Getting the Right Asphalt Mixture Composition

There are a few different ways of obtaining an asphalt mixture composition, the most popular of which are hot and cold. Hot-mix asphalt is made by heating aggregates to decrease the viscosity of the binding agents and make the whole more fluid, then drying it to remove any remaining moisture. It is mixed hot at approximately between 90 and 180° C. It is called hot-mix asphalt, not only because it is mixed hot, it must also preferably remain hot for the paving and compaction for repair or installation. This need for the asphalt mixture composition to remain warm while paving and compacting is performed is one of the reasons so much paving is done in the summer.

Completed asphalt is evaluated for its quality in terms of consistency or viscosity, and purity. These are important parameters for which the asphalt should be properly controlled, so that it is adequately transported and used in paving projects.

Cold-mix asphalt is typically made of quarter inch chip and proprietary oil. This specific make-up keeps the asphalt soft and helps it repel water. As its name suggests, cold-mix asphalt does not need to be warm to be used in asphalt repair. Additives in the oil keep the mixture soft all year long to allow for pothole patching in different types of weather. Even in cold or wet weather, cold-mix asphalt stays soft and repels water, making it perfect for pothole repair in winter and early spring. It will drive water out of the pothole, adhere to the surface underneath and remain flexible, keeping a pothole patched all year long.

The performance of asphalt mixture compositions depends therefore on physical and chemical properties of the, at least one, aggregate and/or the, at least one, binder, such as bitumen. Many new materials have been used to enhance the performance of the asphalt mixture compositions and, on the other hand, to stabilize these materials, especially if there is waste material in pavement.

Asphalt Manufacturing

Most road pavements consist of several layers of different materials which in combination make the road strong and durable. Asphalt pavements are frequently described as flexible pavements, implying their ability to absorb the stresses imposed by traffic and weather without cracking. An example of the component layers of such pavements is illustrated in FIG. 1. The asphalt mixture composition of the present invention is suitable for use in one or more of these layers.

The function of each of the layers is as follows:

The subgrade is typically the natural soil, on old roads usually well compacted by traffic, on new roads carefully shaped and compacted to the appropriate level and profile. Subgrade improvement may be possible by treatment of soils with lime, cement and Ground Granulated Blastfurnace Slag (GGBS) or by adding a 'capping layer' of lower quality aggregate. The sub-base is the lowest layer, put down to help build up the strength of the pavement. It also provides a working platform for the machinery used in laying and compacting the layers above. It is usually made from crushed stone and/or gravel.

The base is typically the main component of an asphalt pavement and provides most of the strength and load distributing properties of the pavement. For very lightly trafficked roads, car parks and pedestrian footways, it is usually made from graded crushed stone and/or hardcore and/or it may be crushed stone bound with a small proportion of cement (cement-bound granular base or lean-mix concrete) and other Hydraulically Bound Materials (HBMs). For most roads and areas carrying heavy vehicles, however, an asphalt base is used to provide a pavement of high strength and durability, to achieve the desired load-bearing capacity and absorb traffic loads so that the underlying subgrade is not deformed.

The binder course typically further contributes to the strength of the pavement, and at the same time provides an even, well-regulated surface to carry the uppermost layer of the pavement. This will be an asphalt mixture composition.

The surface course typically provides an even and weather-resistant surface which can withstand the abrasive forces of traffic and provide appropriate skid resistance for the particular circumstances. Roads are exposed to particularly high stresses, e.g., when the water contained in the pavement structure begins to freeze. Water expands when freezing, which can lead to frost damage that will sooner or later have an impact also on the road surface. This is prevented by a so-called frost blanket which usually consists of a mixture of gravel and sand, supplemented by crushed mineral aggregate. When compacted, these layers of frost-resistant materials conduct water away from the upper pavement layers, reducing tensions very effectively at the same time.

In many cases, a bound base course is overlaid over the unbound base course. Bitumen, cement and/or lime is predominantly used as binder.

The asphalt mixture compositions used for base, binder and surface course are for example mixtures of mineral aggregate (crushed rock, slag, gravel and/or sand) and a binder e.g. of petroleum bitumen and/or modified bitumen to provide particular additional properties. These components are carefully proportioned and mixed to the required specification. Said asphalt mixture compositions are laid and compacted, usually whilst hot or warm, although cold laid mixtures are available.

The performance of the pavement depends a great deal on the care with which the asphalt mixture composition is prepared, laid and compacted.

New Road Construction

Roads and other paved areas must be designed to make them strong and stiff enough to distribute the traffic loads so that neither the underlying soil nor any of the pavement layers are over-stressed. Thus, in designing new pavements the important parameters are the strength of the soil subgrade, the weight and intensity of the expected traffic and the stiffness of the materials available to make up the different pavement layers. However, the potential for damage to pavements and subgrades by water is high, and hence there is an essential need to also include suitably designed pavement drainage systems. Pavement design methods must reflect the environment for which they are intended, e.g., with the relatively wet climate and heavy clay soils in UK, British methods lay considerable emphasis on the importance of a correct evaluation of the load-supporting characteristics of the soil subgrade, and on a proper evaluation of estimated traffic loading. Heavy wheel loads are particularly damaging.

The current design procedure for new roads is described in Volume 7 of the "Design Manual for Roads and Bridges" published by the Stationery Office or downloaded from http://www.standardsforhighways.co.uk/dmrb/index.htm.

Existing Roads

Asphalt mixture compositions have ideal properties for use in strengthening pavements which are showing signs of distress such as cracking, pot-holing or deformation under traffic loading. They can be superimposed on existing roads as overlays, so these roads can continue to carry heavier traffic than that for which they had originally been designed. Alternatively, increased strength in a pavement can be obtained by replacing one or more old surfacing layers with new asphalt mixture composition.

Many existing road pavements consist of layers of different materials laid at different periods and it is often difficult to evaluate the residual strength of such an old pavement and thus estimate the further strengthening required. Methods are, however, available to evaluate pavement strength in situ, by measuring the deflection of the pavement under a load. The Deflectograph, often seen in use on roads in the UK, helps in the assessment of the current condition of road pavements and provides data to assist in the design of overlays when needed. Results of visual assessment techniques and the examination of thicknesses of layers and types of materials present in an existing pavement by excavation of trial pits where required, are also used. The techniques are now highly automated and sophisticated and may be carried out by vehicle-mounted systems travelling at traffic speed. For any situation where the thickness of overlay required is not immediately obvious it is prudent to employ experts using these techniques to provide appropriate designs.

In addition to roads, asphalt mixture compositions are used in many other situations such as:
  Vehicle parking areas
  House-drives
  Footways
  Recreation areas—tennis courts, playgrounds etc.
  Agricultural uses—farm roads, animal cubicles, paved areas etc.
  Airfields—runways and access roads etc.
  Hard standings and storage areas
  Hydraulic applications: dam construction, coastal protection etc.

Quality and Conformity

The evaluation and demonstration of the conformity of asphalt mixture compositions with the requirements of the European asphalt standards is covered by, at least, two standards in the BS EN 13108 series with further explanation and guidance provided by PD 6691. The two standards being:
  BS EN 13108-20 Type Testing
  BS EN 13108-21 Factory Production Control They spell out, in some detail, the obligations of a producer of asphalt, in order to make a declaration that the material conforms to a particular specification drawn from one of the BS EN 13108 standards using the guidance provided by PD 6691.

Once paved, binders are continuously submitted to several degradation processes such as high-temperature rutting, low-thermal cracking and stress fatigue cracking that will compromise its performance over time. These failures will be emphasized if unmodified asphalt binders are used instead of modified binders. Therefore, modification and reinforcement of asphalt binders is in some embodiments necessary.

Environment

Emissions from oil refinery plants and asphalt manufacturers are controlled using equipment that re-collects the dust and particulates and re-uses them in the heating process. This saves them from being emitted into the environment and also increases the efficiency of the heating process. Asphalt recycling also positively impacts the environment: at least 90 million tons of old asphalt pavement is crushed and recycled into new asphalt annually. However, the amount of binder, e.g. bitumen, used in the asphalt mixture composition is still significant, which may be a concern when considering the environmental impact of the manufacturing process of asphalt, and the amount of the residues produced, which need to be handled carefully, increasing also the cost of manufacturing and recycling the asphalt.

Renescience® Technology—Digestate

An environmentally friendly waste processing method is the biologically based Renescience® technology, wherein waste comprising organic matter, such as ordinary unsorted and/or sorted/partially sorted household waste, is mixed with water, one or more enzymes and optionally microorganisms in order to liquefy and/or saccharify organic waste such as food waste, cardboard, paper, labels and similar, and turn it into a bioliquid that can be used for production of biogas via an anaerobic digestion process.

"Renescience® digestate" is the material remaining after anaerobic digestion of a biodegradable feedstock such as bioliquid, e.g., obtained by Renescience® technology. Said digestate may advantageously be separated by one or more separation means, such as filters, sedimentation tanks, filter presses, screw presses (with or without polymers and/ot other chemicals such as flocculants) or the like into "dewatered digestate" and "reject water"—see FIG. 2.

The method of manufacturing an asphalt mixture composition according to the present invention is, in at least one embodiment, based on this Renescience® technology and compatible with any process wherein waste comprising organic matter has been subject to a biological treatment such as enzymatic hydrolysis and/or microbial fermentation to liquefy and/or saccharify the organic fraction in a waste composition and thereby producing a bioliquid. Examples of such waste treatment processes are disclosed in WO2006056838, WO2007036795, WO2011032557, WO2013185778, WO2014198274, WO2016030480, WO2016030472, WO2016050893, WO2017/174093 and European Patent application 18156484.0 which are hereby expressly incorporated by reference in their entirety. Said process takes place most preferably inside a bioreactor, herein referred to as a "Renescience® bioreactor".

Renescience® technology refers to a method of providing a bioliquid from waste comprising:
a) subjecting waste to a combined enzymatic and microbial treatment in a bioreactor, wherein the microbial treatment comprises lactic acid producing bacteria;
b) subjecting the treated waste from step a) to one or more separation step(s), whereby a bioliquid fraction is provided; and
c) optionally subjecting said bioliquid fraction to anaerobic digestion (AD),
wherein, The combined enzymatic and microbial treatment of the waste in step a) is performed in a bioreactor. The treatment is performed by adding one or more hydrolytic enzymes and by the bacteria present in the waste. Optionally, standard, cultivated, or manipulated yeast, bacteria, or any other microorganism capable of converting the organic matter present in the waste into organic acids or other compositions suitable for subsequent biogas production in an anaerobic digestion process may be added to the bioreactor. The enzymes are supplied in either native form or in form of microbial organisms giving rise to the accumulation of such enzymes.

The combined enzymatic and microbial treatment in step a) may be performed by adding one or more hydrolytic enzymes, supplied in either native form and/or in form of microbial organisms giving rise to the accumulation of such enzymes; and/or by the bacteria present in the waste and/or optionally by adding standard, cultivated, or manipulated yeast, bacteria, or any other microorganism capable of converting the organic matter present in the waste into organic acids or other compositions, such as lactic acid, 3-hydroxypropionic acid (3-HPA), 1,4-butanediol (BDO), butanedioic acid (succinic acid), ethane-1,2-diol (ethylene glycol), butanol or 1,2-propanediol (propylene glycol), suitable for subsequent biogas production in an anaerobic digestion process.

Microorganisms that may be added to the bioreactor in step a) include yeasts, and/or fungi and/or bacteria.

Other microorganisms that may be added to the bioreactor in step a) include bacteria that can efficiently ferment hexose and pentose including but not limited to cellobiose, glucose, xylose and arabinose to short chain organic acids including but not limited to citric acid, lactic, formic acid, acetic acid, butyric acid, valeric acid, isovaleric acid and propionic acid as well as alcohols including but not limited to ethanol.

Other microorganisms that may be added to the bioreactor in step a) include fermenting organisms such as *Bacillus* sp., e.g. *Bacillus coagulans; Candida* sp., *Clostridium* sp., *Klebsiella* sp., *Lactobacillus* sp., *Escherichia* sp., such as *E. coli*, especially *E. coli* strains that have been genetically modified to improve the yield of ethanol, bioethanol or lactic acid, *Streptococcus* sp., *Enterococcus* sp., among others.

The fermenting microorganisms may have been genetically modified to provide the ability to ferment pentose sugars, such as xylose utilizing, arabinose utilizing, and xylose and arabinose co-utilizing microorganisms.

The fermenting organisms may comprise one or more polynucleotides encoding one or more cellulolytic enzymes, hemicellulolytic enzymes, and accessory enzymes described herein.

The microorganisms present in the waste or added to the bioreactor, may produce organic acid or other compositions, such as lactic acid, 3-hydroxypropionic acid (3-HPA), 1,4-butanediol (BDO), butanedioic acid (succinic acid), ethane-1,2-diol (ethylene glycol), butanol or 1,2-propanediol (propylene glycol), that may be used as feed in a subsequent anaerobic digestion process. These organic acids or other compositions further include acetate, propionate and butyrate. Waste that is suitable for treatment normally comprises, at least, lactic acid producing bacteria.

When microorganisms are added and/or the waste is inoculated prior to the combined enzymatic and microbial degradation in step a) one or more species of lactic acid producing bacteria can be used.

It will be readily understood by one skilled in the art that a bacterial preparation used for inoculation may comprise a community of different organisms. One or more naturally occurring bacteria which exist in any given geographic region and which are adapted to thrive in waste, such as MSW, from that region, can be used. As is well known in the art, lactic acid producing bacteria are ubiquitous and will typically comprise a major component of any naturally occurring bacterial community within waste, such as MSW.

In a preferred embodiment, the microbial treatment in step a) is performed by a microbial composition wherein the majority of the living microorganisms are lactic acid producing bacteria including, e.g. *Bacillus coagulans*.

The microbial treatment in step a) may be performed by a microbial composition wherein at least 10%, 15%, 20%, 25%, 30%, 35%, 40%, 45%, 50%, 55%, 60%, 65%, 70%, 75%, 80%, 85%, 90%, 95% or 99% of the living microorganisms are lactic acid producing bacteria.

The treatment step a) may comprise contacting the waste with at least a live lactic acid bacteria and/or other microorganisms including fermenting organisms such as *Bacillus coagulans* concentration of approximately $1 \times 10^5$ CFU/ml, $1 \times 10^6$ CFU/ml, $1 \times 10^7$ CFU/ml or $9 \times 10^7$ CFU/ml. When these microorganisms are added to the waste, these should be added at a concentration of at least $1 \times 10^5$ CFU/ml, $1 \times 10^6$ CFU/ml, $1 \times 10^7$ CFU/ml or $9 \times 10^7$ CFU/ml. In a preferred embodiment these microorganisms are added to and/or present in the waste at a concentration of $1 \times 10^6$ CFU/ml to $9 \times 10^6$ CFU/ml.

The treatment step a) may comprise addition of cellulase activity by inoculation with one or more microorganism(s) that exhibits extracellular cellulase activity.

In step a) the waste is treated with an enzyme composition. Suitable enzyme compositions are well known in the art and are commercially available. A suitable enzyme composition comprises one or more cellulases and/or one or more hemicellulases and/or one or more starch degrading enzymes. A suitable enzyme composition is for instance a composition comprising a cellulolytic background composition combined with one or more enzymes selected from (i) a protease; (ii) a lipase and (iii) a beta-glucanase; and optionally combined with one or more further enzymes selected from (iv) a pectate lyase; (v) a mannanase and (vi) an amylase.

The treatment in step a) may be accomplished by treating the waste with an enzyme composition comprising a cellulolytic background composition and one or more enzymes selected from (i) a protease, (ii) a lipase, and (iii) a beta-glucanase. The treatment in step a) may be accomplished by treating the waste with an enzyme composition comprising a cellulolytic background composition and (i) a protease, (ii) a lipase, and (iii) a beta-glucanase.

The treatment in step a) may be accomplished by treating the waste with an enzyme composition comprising a cellulolytic background composition and two or more enzymes selected from (i) a protease, (ii) a lipase, and (iii) a beta-glucanase (e.g. a protease and a lipase; a protease and a beta-glucanase; or a lipase and a beta-glucanase). The treatment in step a) may be accomplished by treating the waste with an enzyme composition comprising a cellulolytic background composition and (i) a protease, (ii) a lipase, and (iii) a beta-glucanase and further comprising one or more enzymes selected from (iv) a pectate lyase, (v) a mannanase, and (vi) an amylase.

Said cellulolytic background composition (CBC) may comprise one or more enzymes selected from the group comprising: a) a cellobiohydrolase I or variant thereof; (b) cellobiohydrolase II or variant thereof; (c) beta-glucosidase or variant thereof; and (d) a polypeptide having cellulolytic enhancing activity and/or homologs of any of the aforementioned enzymes, including any combination of any of the aforementioned.

In particular, the cellulolytic background composition may comprise a cellobiohydrolase I or a variant thereof; a cellobiohydrolase II or a variant thereof; a beta-glucosidase or a variant thereof; and a polypeptide having cellulolytic enhancing activity; or homologs of any of the aforementioned enzymes, including any combination of any of the aforementioned.

The cellulolytic background composition may comprise one or more enzymes selected from (a) an *Aspergillus fumigatus* cellobiohydrolase I or variant thereof; (b) an *Aspergillus fumigatus* cellobiohydrolase II or variant thereof; (c) an *Aspergillus fumigatus* beta-glucosidase or variant thereof; and (d) a *Penicillium* sp. GH61 polypeptide having cellulolytic enhancing activity; or homologs thereof.

The cellulolytic background composition may comprise a commercial cellulolytic enzyme preparation. Examples of commercial cellulolytic enzyme preparations suitable for use in the Renescience process include, for example, CELLIC® CTec (Novozymes A/S), CELLIC® CTec2 (Novozymes A/S), CELLIC® CTec3 (Novozymes A/S), Cellic CTec RE (Novozymes A/S), CELLUCLAST® (Novozymes A/S), NOVOZYM™ 188 (Novozymes A/S), SPEZYME™ CP (Genencor Int.), ACCELLERASE™ TRIO (DuPont), FILTRASE® NL (DSM); METHAPLUS® S/L 100 (DSM), ROHAMENT™ 7069 W (Röhm GmbH), or ALTERNAFUEL® CMAX3™ (Dyadic International, Inc.).

The cellulolytic enzyme preparation is added in an amount effective from about 0.001 to about 5.0 wt. % of solids, e.g., about 0.025 to about 4.0 wt. % of solids or about 0.005 to about 2.0 wt. % of solids.

Any "Auxiliary Activity 9 polypeptide" or "AA9" polypeptide can be used as a component of the enzyme composition.

The protease may be present at a ratio between 0-20% w/w, such as e.g. 10% w/w of the total enzyme protein. The beta-glucanase may be present at a ratio between 0-30% w/w, such as e.g. 15% w/w of the total enzyme protein. The pectate-lyase may be present at a ratio between 0-10% w/w, such as e.g. 5% w/w of the total enzyme protein. The mannanase or amylase may be present at a ratio between 0-10% w/w, such as e.g. 5% w/w of the total enzyme protein. The cellulolytic enzyme blend may be present at a ratio between 40%-99% w/w, such as e.g. between 50%-90% w/w, such as e.g. 60%-80% w/w, such as e.g. 65-75% of the total enzyme protein.

The enzyme composition may further comprise one or more enzymes selected from a cellulase, an AA9 polypeptide, a hemicellulase, a cellulose inducible protein (CIP) an esterase, an expansin, a ligninolytic enzyme, an oxidoreductase, a pectinase, a protease, and a swollenin.

Said hemicellulase may be one or more enzymes selected from the group consisting of a xylanase, an acetylxylan esterase, a feruloyl esterase, an arabinofuranosidase, a xylosidase, and a glucuronidase.

The enzymatic hydrolysis of the biodegradable parts of the waste concurrently with microbial fermentation according to step a) may be performed at a temperature above 20° C. and up to 75° C. resulting in liquefaction and/or saccharification of biodegradable parts of the waste and accumulation of microbial metabolites.

The method according to treatment step a) may be performed at a temperature between 20 and 75° C., 30 and 70° C., 40 and 60° C., 45 and 55° C., and/or around 50° C.

It can be advantageous to adjust the temperature of the waste such as MSW prior to initiation of enzymatic hydrolysis. As is well known in the art, cellulases and other enzymes typically exhibit an optimal temperature range. While examples of enzymes isolated from extreme thermophilic organisms are certainly known, having optimal temperatures on the order of 60 or even 70° C., enzyme optimal temperature ranges typically fall within the range 35° C. to 55° C. Enzymatic hydrolysis may be conducted within the temperature range 30 to 35° C., or 35° C. to 40° C., or 40° C. to 45° C., or 45° C. to 50° C., or 50° C. to 55° C., or 55° C. to 60° C., or 60° C. to 65° C., or 65° C. to 70° C., or 70° C. to 75° C.

It can be advantageous to agitate during heating to achieve evenly heated waste. Agitation further achieves the introduction of mechanical energy to create shear forces in the waste and the waste mix. Agitation can comprise free-fall mixing, such as mixing in a reactor having a chamber that rotates along a substantially horizontal axis or in a mixer having a rotary axis lifting the waste such as MSW or in a mixer having horizontal shafts or paddles lifting the waste such as MSW. Agitation can comprise one or more of shaking, stirring or conveyance through a transport screw conveyor. The agitation may continue after waste such as MSW has been heated to the desired temperature.

The bioreactor in step a) may be adapted to process more than 1; 5; 10; 15; 20; 25; 30; 35; 40; 45; or 50 t waste/h.

The waste, e.g. MSW, may have a Dry Matter (DM) content in the range 10-90; 20-85; 30-80; 40-75; 50-70; or 55-65% (w/w); and/or around 10; 15; 20; 25; 30; 35; 40; 45; 50; 55; 60; 65; 70; 75; 80; 85; or 90% (w/w).

The DM content of the waste may be determined at different points in time. The DM content of the waste may be measured or assessed (i) before entry into the bioreactor in step a), such as in the waste pit or transfer station; (ii) at the onset of said combined enzymatic and microbial treatment of the waste entering the bioreactor in step a); and/or (iii) before provision of the bioliquid obtained in step a) through one or more solid/liquid separation step(s).

Thus, the DM content of the waste may be measured or assessed at one or more of the following points in time: (i) before entry into the bioreactor in step a); ii) at the onset of said combined enzymatic and microbial treatment of the waste entering the bioreactor in step a); (iii) before provision of the bioliquid obtained in step a) through one or more solid/liquid separation step(s).

As a practical matter, notwithstanding some variability in the composition of the waste being processed, it is convenient to add a relatively constant mass ratio of water (which includes aqueous solution) in step a). For instance, when the waste to be treated is municipal solid waste (MSW) it will be convenient to add between 0.8 and 1.8 kg water per kg MSW, or between 0.5 and 2.5 kg water per kg MSW, or between 1.0 and 3.0 kg water per kg MSW. As a result, the actual non-water content of the waste (or MSW) during processing may vary within the appropriate range.

Step b) is a separation step where the bioliquid is separated from the non-degradable fractions. Clean and efficient use of the degradable component of waste, such as MSW, combined with recycling typically requires some method of sorting or separation to separate degradable from non-degradable material. The separation in step b) may be performed by any means known in art, such as in a ballistic separator, washing drums and/or hydraulic presses. In one embodiment the separation is performed before the enzymatic hydrolysis. Separation of liquid and solids can e.g. be done in different presses (such as screw and/or piston presses) or e.g. using a simpler sieve function. A ballistic separator is typically used to separate the solids into 2D and 3D fractions and only secondarily a liquid separation.

Step b) can be conducted before, during or after combined enzymatic and microbial treatment in a bioreactor, wherein said step b) while being conducted during the combined enzymatic and microbial treatment may, in one embodiment, occur after said enzymatic treatment but prior to said microbial treatment in a bioreactor.

Separation of liquefied and/or saccharified, fermentable parts of the waste from non-fermentable solids can be achieved by a variety of means. Using one separation operation or a combination of at least two different separation operations, including but not limited to screw press operations, ballistic separator operations, vibrating sieve operations, or other separation operations known in the art may be applicable.

Separation

In this step, the bioliquid is separated from the non-degradable fractions. The separation is typically performed by one or more separation steps means, which could be exemplary performed by those of one or more ballistic separator(s), sieve(s), washing drum(s), presses and/or hydraulic press(es). The one or more separation means separate the waste such as MSW treated with combined enzyme and microbial action, into the bioliquid, a fraction of 2D materials, e.g., non-biodegradable and a fraction of 3D materials, e.g., non-biodegradable. The 3D fraction (such as cans and plastic bottles) does not bind large amounts of bioliquid, so a single washing step is often sufficient to clean the 3D fraction. The 2D fraction (textiles and foils as examples) typically binds a significant amount of bioliquid. Therefore, the 2D fraction is typically pressed using e.g. a screw press, washed and pressed again to optimize the recovery of bioliquid and to obtain a more clean and dry 2D fraction. Inert material which is sand and glass is typically removed e.g. sieved from the bioliquid. Metals are typically removed from all mentioned fractions. The water used in one or more of the washing drums can be recirculated, heated and then used for heating of the waste during the first step. The 2D fraction can be further separated into recyclables and/or residuals such as SRF (Solid Recovered Fuel), RDF (Refused Derived Fuel) and/or inert materials. The 3D fraction can also be further separated into recyclables and/or residuals such as metals, 3D plastic and/or RDF.

Step c) refers to anaerobic digestion (AD), which is a series of biological processes in which microorganisms break down biodegradable material in the absence of oxygen. One of the end products is biogas, which can be combusted to generate electricity and/or heat, or can be processed into renewable natural, biomethane gas and/or transportation fuels. A range of anaerobic digestion technologies exists in the state of the art for converting waste, such as municipal solid waste, municipal waste water solids, food waste, high strength industrial wastewater and residuals, fats, oils and grease (FOG), and various other organic waste streams into biogas. Many different anaerobic digester systems are commercially available and the skilled person will be familiar with how to apply and optimize the anaerobic digestions process. The metabolic dynamics of microbial communities engaged in anaerobic digestion are complex. In typical anaerobic digestion (AD) for production of methane biogas, biological processes mediated by microorganisms achieve four primary steps—hydrolysis of biological macromolecules into constituent monomers or other metabolites; acidogenesis, whereby short chain hydrocarbon acids and alcohols are produced; acetogenesis, whereby available nutrients are catabolized to acetic acid, hydrogen and carbon dioxide; and methanogenesis, whereby acetic acid and hydrogen are catabolized by specialized archaea to methane and carbon dioxide. The hydrolysis step is typically rate-limiting and dependent on the biomass type. In the bioliquid it is the methanogens that limits the processing rate. From AD is furthermore obtained digestate, comprising a solid fraction and a liquid fraction (reject water), in particular, comprising a water-like liquid with separable suspended particles.

In order for a common AD process to work efficiently, the pH should generally remain between 6.0 and 9.0, preferably between 6.5 and 8.3. This can be largely affected by the carbon dioxide produced within the biogas. The process itself produces the pH buffer (alkalinity concentration) by the production/release of HCO3− and NH4+. Stability may be increased by maintaining high alkalinity concentrations. Decreases in pH may be due to accumulation of organic acid intermediates, often due to the presence of wastes that reduce the ability of methanogens to turn those wastes into biogas, because of the inhibition of the methanogenic conversion of previous process products into biogas. Ammonia is passively released as proteins are broken down. Bicarbonates are the primary buffer for balancing alkalinity with pH. Bicarbonate is produced in the same process as methane. Ammonia ions can be released into the liquid from protein breakdown. Ammonia is always as an equilibrium of ammonia to ammonium-ion in a liquid. When temperature increases, more is available as free ammonia which can act as a methanogene inhibitor at the right concentration.

Acetate and acetic acid is the same as is the direct precursor of methane. During the process, acetate is removed and turned into methane. Only if the process is unbalanced and the methanogenic microbes cannot remove the produced acetate, the pH goes down. This in terms means that the pH decrease is only the symptom—the problem is the inability to convert acetate. The sugar content of the substrate affects the methane percentage of the resulting biogas.

To ensure proper pH maintenance, e.g., in laboratory batch digesters, alkalinity can be added at the beginning of the digestion batch. Common alkaline additives include sodium bicarbonate, potassium bicarbonate, potassium carbonate, sodium nitrate, and anhydrous ammonia. The AD digestate released from the AD process is accordingly alkaline.

AD digestate or a basic fraction thereof, can be used for regulating the pH in the Renescience® bioreactor to between approximately 4.5 and 6 thereby keeping the combined enzymatic and microbial degradation process running continuously. The AD digestate or an alkaline fraction thereof obtained in step c) may comprise or consist of one or more of: i) reject water, ii) a purified water fraction obtained from AD digestate and/or reject water and/or iii) brine.

As the digestate (and thus the AD digester content) is mostly alkaline, it cannot be used to adjust the bioreactor pH downwards—only upwards. This may be an advantage after the bioreactor pH is initially taken down to below 5 by the lactic acid bacteria and/or other microorganisms because the AD water counteracts the further drop in pH in the Renescience® Bioreactor and thus enhances the sugar to lactic acid conversion ability.

It is well known in the art, that the conversion of biodegradable organic material in waste into $CH_4$ and $CO_2$ during the combined enzymatic and microbial treatment followed by anaerobic digestion process is facilitated by three major groups of microorganisms. The fermenting microorganisms converts the organic material to short-chain fatty acids (especially lactic acid) through hydrolysis by extracellular enzymes and subsequent fermentation of the hydrolysed products. Other products of the fermentation process are acetic acid, alcohols, $CO_2$ and $H_2$. The end products from the fermenting and the acidogenic bacteria (lactic acid, formic acid, acetic acid, and $H_2$) are converted to $CH_4$ and $CO_2$ by methane producing microorganisms. The methane producing microorganisms can, in some embodiments, comprise microorganisms belonging to the archaea domain.

The anaerobic digestion in step c) may comprise one or more reactors operated under controlled aeration conditions, eliminating or minimizing the available oxygen, in which methane gas is produced in each of the reactors comprising the system. The AD reactor(s) can, but need not, be part of the same waste processing plant as the bioreactor in step a) and can, but need not, be connected to the bioreactor in step a). Moreover, the AD process may be in the form of a fixed filter system. A fixed filter anaerobic digestion system is a system in which an anaerobic digestion consortium is immobilized, optionally within a biofilm, on a physical support matrix.

The AD digestate obtained in step c) or an alkaline fraction thereof, may be provided by the use of one or more anaerobic digester(s) comprising attachment means for microbial biofilms.

The AD digestate obtained in step c) or an alkaline fraction thereof, may be provided by the use of a device comprising a carrier matrix.

The AD digestate obtained in step c) or an alkaline fraction thereof, may be provided by the use of a digester disclosed in WO2016050893.

Promoting microbial fermentation concurrently with enzymatic hydrolysis at thermophilic conditions, e.g. above approximately 45° C., improves "organic capture", either using "ambient" microorganisms or using selectively "inoculated" microorganisms. That is, concurrent thermophilic microbial fermentation safely increases the organic yield of bioliquid. For the present invention, liquefaction and fermentation is performed at temperatures wherein ambient microorganisms survive, the specific temperature however depending on the specific kind of waste to be treated, and/or the end products to be obtained.

In addition to improving "organic capture" from enzymatic hydrolysis, concurrent microbial fermentation using any combination of lactic acid bacteria, or acetate-, ethanol-, formate-, butyrate-, lactate-, pentanoate- or hexanoate-producing microorganisms, "pre-conditions" the bioliquid to render it more efficient as a substrate for further processing, such as biomethane production. Microbial fermentation produces bioliquid having a generally increased percentage of dissolved compared with suspended solids, relative to bioliquid produced by enzymatic liquefaction alone. The conversion of the organic matter in the waste preferably include at least lactic acid producing bacteria. The resulting bioliquid comprising a high percentage of microbial metabolites provides a biomethane substrate, a substrate suitable for anaerobic digestion for production of biogas.

Anaerobic digestion (AD) is a series of biological processes in which microorganisms break down biodegradable material in the absence of oxygen. One of the end products is biogas, which can be combusted to generate electricity, heat and/or can be processed into renewable natural gas and/or transportation fuels. A range of anaerobic digestion technologies exists in the state of the art for converting waste, such as municipal solid waste, municipal waste water solids, food waste, high strength industrial waste water and residuals, fats, oils and grease, and various other organic waste streams into biogas. Many different anaerobic digester systems are commercially available and the skilled person will be familiar with how to apply and optimize the anaerobic digestions process. The metabolic dynamics of microbial communities engaged in anaerobic digestion are complex. In typical anaerobic digestion for production of methane biogas, biological processes mediated by microorganisms achieve four primary steps—hydrolysis of biological macromolecules into constituent monomers or other metabolites; acidogenesis, whereby short chain hydrocarbon acids and alcohols are produced; acetogenesis, whereby available nutrients are catabolized to acetic acid, hydrogen and carbon dioxide; and methanogenesis, whereby acetic acid and hydrogen are catabolized by specialized archaea to methane and carbon dioxide.

AD produces digestate, sometimes called "raw digestate" or "AD digestate" or "AD effluent". These terms can be used interchangeably and refers to the waste product from anaerobic digestion. The digestate comprises both solids and liquids and these fractions may be used for various purposes. A solid-liquid separation can for instance be done by decantation, centrifugation and/or sedimentation. Usually, digestate comprises mainly water, wherein the raw digestate from the AD has a total solid content of about 4-8% and after the dewatering the solid digestate has a total solid content of 25-30% by weight, the rest being water. It also comprises non-degradable organics, suspended solids and dissolved matter such as dissociated salts and has alkaline pH. Reject water is defined as the liquid fraction obtained after one or more solid-liquid separations of the AD digestate.

The standard of digestate produced by anaerobic digestion can be assessed at least on three criteria, chemical, biological and physical aspects. Chemical quality needs to be considered in terms of heavy metals and other inorganic contaminant, persistent organic compounds and the content of macro-elements such as nitrogen, phosphorus and potassium.

The physical standards of composts include mainly appearance and odour factors. Whilst physical contamination does not generally present a problem with regards to human, plant or animal health, contamination (in the form of plastics, metals and ceramics) can cause a negative public perception. There is, currently, a public debate regarding both micro and visible plastics ending in natural resources and being eaten by animals or getting entangled, which may cause health problems. Also, sharp materials (such as glass or metals) are considered an issue when used in nature (for fertiliser or land restoration applications) due to the risk of cutting. Even if the compost is of high quality and all standards are met, a negative public perception of waste-based composts still exists. The presence of visible contaminants reminds users of this.

Quality control of the feedstock is the most important way of ensuring a quality end product. The content and quality of waste arriving on-site should be characterised as thoroughly as possible, prior to being supplied.

Sustainable Solutions

Because deteriorating roads are a constant problem for cities and countries, there is a need for providing economical paving materials having additives and, optionally, fillers which improve the quality and performance of the asphalt mixture composition, e.g. the thickness of the pavement, the composition of said asphalt mixture composition and its rut depth determined by wheel tracking, stiffness modulus and water sensitivity, as well as the binder's properties, such as softening point and penetration, among other parameters/properties, such as fatigue cracking properties and aging properties.

Significant and justifiable concerns with the environment and global warming have brought the urgent need to address both preventive and corrective measures to reduce carbon emissions and disposal of non-reusable or toxic residues, resulting from industrial or domestic environments as much as possible. There is a need for increasing the recycling rate of such residues and therefore to investigate further into what could be done in this field. Incorporating several waste materials per se, such as plastic, sewage sludge and other materials in asphalt compositions has been previously done. Waste materials and sludge typically comprise as main components organic matter, water and inorganic matter.

However, the achieved properties of these prior art asphalt compositions were far from what is desired, i.e., not maintaining or improving the quality and/or safety of the asphalt composition, when compared to asphalt compositions not comprising waste materials. In fact, such properties, particularly those impacting on duration of asphalt, were frequently compromised.

A further need was therefore identified: to provide sustainable solutions for recycling residues, e.g. digestate such as the waste derived digestate from Municipal Solid Waste (MSW) processes comprising liquefaction of the organic fraction of MSW by addition of one or more enzymes

SUMMARY OF THE INVENTION

The present invention provides a solution based in the replacement of, at least a part of, a binder or a binder composition comprised by an asphalt mixture composition, said binder or binder composition preferably being bitumen or polymer modified bitumen, with digestate additive. The asphalt mixture composition further comprises aggregate(s) and may comprise one or more further component(s), such as filler(s) and/or additive(s).

The present invention provides, in a first aspect, an asphalt mixture composition comprising one or more binders, one or more aggregates, optionally one or more fillers and/or additives, wherein said, at least one, additive is digestate.

In a second aspect, an asphalt composition comprising digestate ash as a filler is provided.

In a third aspect, the present invention provides a method of manufacturing said asphalt mixture composition.

In a fourth aspect, the present invention provides the use of digestate additive and of a binder comprising said digestate additive for building roads and pavements. The present invention also relates to use of digestate additive for preparation of an asphalt mixture composition e.g. for use in road construction.

In a preferred embodiment, the asphalt mixture composition of the present invention is obtained by state of the art methods for preparation of an asphalt mixture composition and replacement of at least a part of the binder, preferably bitumen, with digestate additive, wherein, e.g., up to about 70% (w/w) of the asphalt mixture composition comprising said binder is replaced with digestate additive.

The bitumen is mainly used for paving due to its workability properties that allows an easy road execution but when it gets cold it behaves as an elastic solid that brings cohesion to the final asphalt mixture composition; consequently, supporting and resisting the efforts and loads of the normal traffic.

Said digestate additive can be any type of digestate including digestate derived from an AD process. In a preferred embodiment, the digestate additive is what is defined herein as Renescience® digestate additive, Renescience® digestate ash, sewage sludge digestate additive, industrial waste digestate additive and/or food waste digestate additive, comprising only one of these digestates or a combination of at least two of them.

In another preferred embodiment the digestate additive is derived from an AD process where the substrate was generated by biologic treatment (such as enzymatic treatment and/or microbial treatment) of a waste composition such as MSW.

The asphalt mixture composition of the present invention therefore provides at least two main advantages, in view of state of the art:
1) Sustainable solution for recycling the Renescience® digestate;
2) Improved or preserved properties of the asphalt mixture compositions, such as wheel rutting, stiffness modulus, water sensitivity or thickness of the pavement layer, and of the binder(s) comprised by said asphalt composition, such as softening point penetration and anti-aging properties, among other relevant quality assessing properties regarding durability, safety and performance of said asphalt mixture composition.

It has surprisingly been found that either the preservation or the improvement of the above mentioned properties (2) was achieved when replacing the binder of an asphalt mixture composition according to the present invention with about 0.5%, 1%, 5%, 10%, 15%, 20%, 25%, 30%, 35%, 40%, 45%, 50%, 55%, 60%, 65% or 70% of digestate additive by weight of said asphalt mixture composition. Accordingly, an asphalt mixture composition can be prepared wherein the binder such as bitumen can be replaced with about 0.5%-1%, 1%-5%, 5%-10%, 10%-15%, 15%-

20%, 20%-25%, 25%-30%, 30%-35%, 35%-40%, 40%-45%, 45%-50%, 50%-55%, 55%-60%, 60%-65% or 65%-70% of digestate additive by weight of said asphalt mixture composition; or any combination of these ranges.

DETAILED DESCRIPTION OF THE INVENTION

Figure 1:
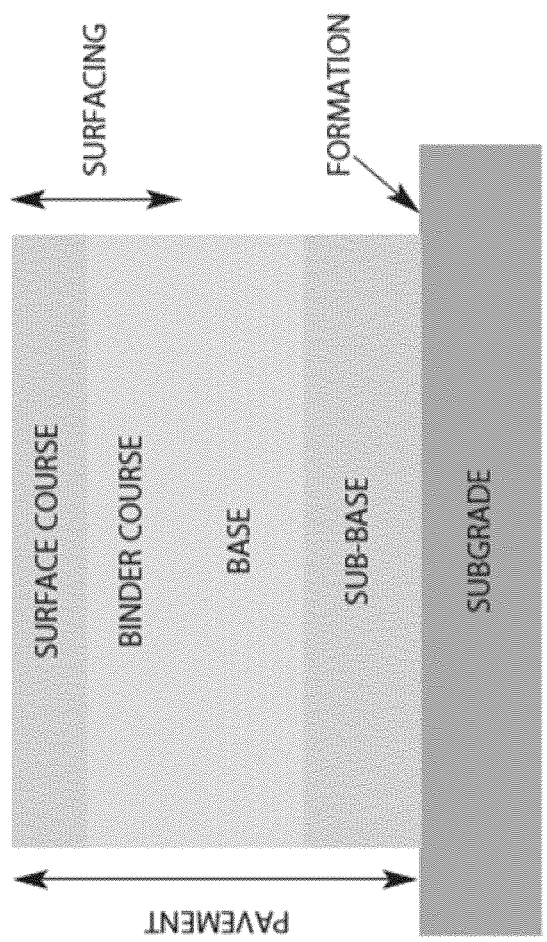
FIG. 1—Schematic view of a road pavements consisting of several layers of different materials.
Figure 2:
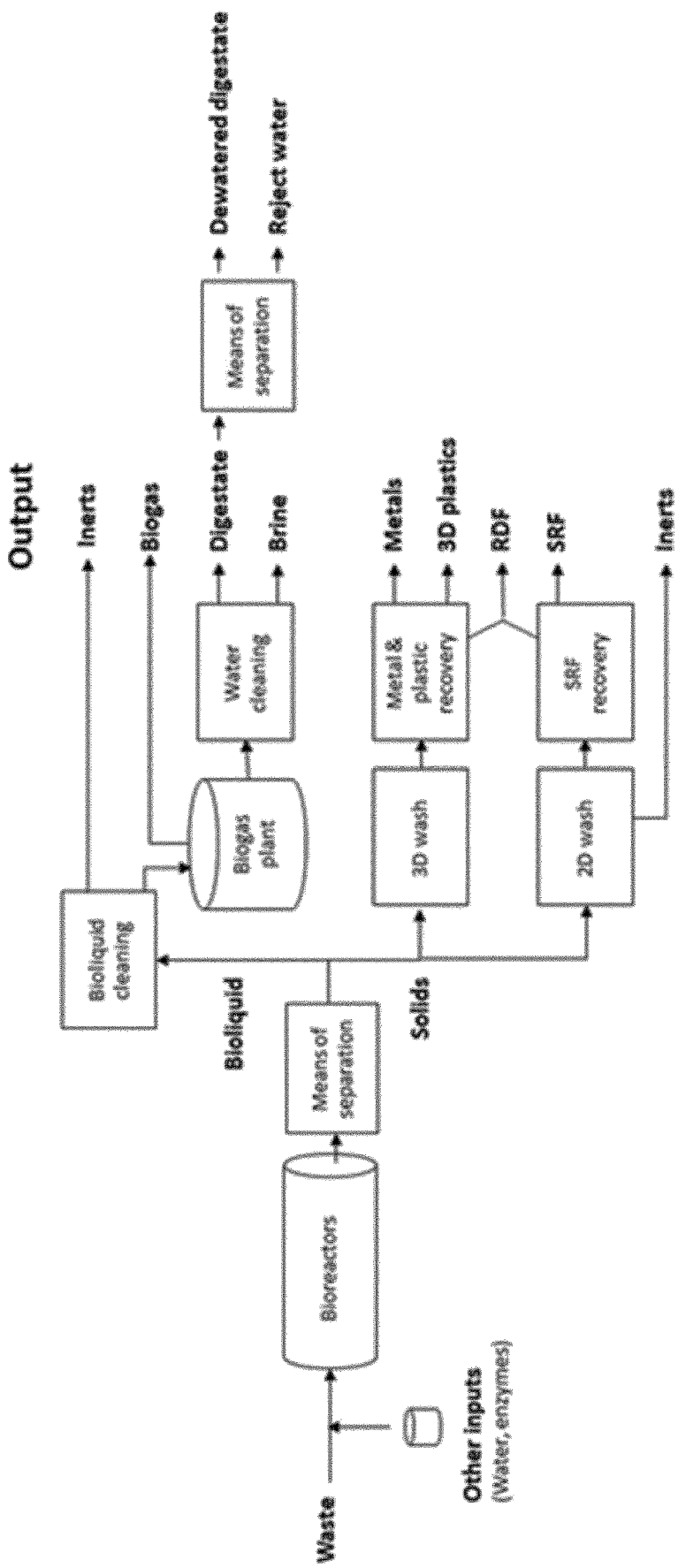
FIG. 2—Representative view of Renescience® technology.

The present invention provides, in a first aspect, an asphalt mixture composition comprising one or more binders, one or more aggregates, optionally one or more fillers and/or additives, wherein said, at least one, additive or filler is digestate.

In a second aspect, the present invention provides a method of manufacturing said asphalt mixture composition and, in a third aspect, the use of digestate additive for making an asphalt mixture composition and/or for building roads and/or pavements.

Preparation of Renescience® Digestate Additive

Renescience® digestate additive is prepared from unsorted municipal solid waste (MSW), treated with the Renescience® technology, comprising enzymatic treatment from e.g. one or more added enzymes and subsequently being subjected to anaerobic digestion as described in WO2014/198274 and WO2013/18778.

The concept of the Renescience® Waste Refinery is to sort waste such as MSW into different fractions e.g. as exemplified by the four fractions listed below:
  (i) a biogenic slurry, also called bioliquid, suitable for biomethane production and other processes,
  (ii) inerts, such as glass and sand, for recycling,
  (iii) a "two dimensional" (2D) fraction and
  (iv) a "three dimensional" (3D) fraction, both 2D and 3D fractions comprising inorganic materials, suitable for Refuse Derived Fuel (RDF) and Solid Recovered Fuel (SRF) production as well as for recycling of metals, plastic and wood.

MSW from urban areas was collected. The MSW was transported to the Renescience® Waste Refinery where it was stored in a waste pit until processing.

The waste, with added enzymes, was incubated in a reactor termed a "bioreactor" similar to that described in WO2011/032557, which moved MSW continuously from the input to the output end.

The raw digestate from anaerobic digestion with stable biogas production was collected and stored in a freezer at −18° C. until needed for further testing. Raw digestate does not need to be frozen previously to be used within the scope of the present invention.

The frozen digestate was then processed as in Example 1.1 and separated into a liquid phase and solid digestate. The solid digestate was dried e.g at 105° C. until constant mass.

Preparation of Food Waste Digestate Additive

Food waste digestate additive is prepared by anaerobic digestion (AD) of food waste using a state of the art AD system. Solid food waste digestate can e.g. be acquired from an industrial AD plant operating on mixed food waste feedstock. 'Solid digestate' comprises a total solid content of about 25%, i.e. it is wet and not usable in asphalt. Food waste digestate is not a proper 'food waste digestate additive' before it has been dried to a moisture content lower than 10% and typically ground to powder. The 'food waste digestate additive' can be in the form of pellets and/or granules e.g. having a diameter of from 1-10 mm.

The food waste feedstock can be comprised of varying materials, all of which typically are source segregated biodegradable wastes, compliant with the acceptable wastes in the Anaerobic Digestate Quality Protocol—see also Example 1.2.

Preparation of Sewage Sludge Digestate Additive

Solid sewage sludge digestate can e.g. be acquired from a larger urban municipal waste water treatment plant. The waste water goes through typical waste water treatment to produce primary sludge and secondary sludge, originating sewage sludge digestate which is dewatered at the waste water treatment plant.

The solid sewage sludge digestate is typically collected and stored before being dried e.g. at 105° C. until constant mass—see also Example 1.3.

Preparation of Other Types of Digestate Additive

The digestate additive can be digestate from a state-of-the-art anaerobic digestion of one or more types of waste/feed stocks selected from the group consisting of:
  household waste, sewage sludge, general food waste, industrial waste, cellulosic waste, plant waste, animal waste, animal food waste, vegetable food waste, paper and/or carton waste, textile waste, waste fractions derived from industry such as restaurant industry, food processing industry, general industry, waste fractions from paper industry, waste fractions from recycling facilities, waste fractions from food or feed industry, waste fractions from the medicinal or pharmaceutical industry, waste fractions from hospitals and clinics, waste fractions derived from agriculture or farming related sectors, waste fractions from processing of sugar or starch rich products, contaminated or in other ways spoiled agriculture products such as grain, potatoes and beets not exploitable for food or feed purposes, garden refuse, argent feed stock such as fatty acid rich feed stock, and starch industry feed stock.

Mixing Digestate Additive and the Binder, in an Asphalt Mixture Composition

A method is herein provided to manufacture an asphalt mixture composition comprising digestate additive, comprising the following steps:
  a) Providing the digestate additive;
  b) Providing the aggregate(s) and optionally filler(s);
  c) Providing the binder(s);
  d) Mixing the aggregate(s), optionally filler(s) and binder(s) with digestate additive to obtain an asphalt mixture composition,
  characterized in that:
  (i) the digestate additive is obtained by mixing waste comprising organic matter, such as ordinary unsorted and/or sorted/partially sorted household waste, with water, enzymes and optionally microorganisms in order to liquefy and/or saccharify organic waste such as food waste, cardboard, paper, labels and similar, and turn it into a bioliquid that can be used for production of biogas via an anaerobic digestion process; and typically, in that (ii) aggregates and optionally filler, when not dry, are dried e.g. at about 110±15° C., to reach constant mass;

(iii) aggregates and optionally filler are then mixed preferably to meet the requirements of AC20 Dense Bin 40/60 according to EN 13108-1:2016;

(iv) binder is typically heated e.g. to about 155±25° C., for example between 1 to 12 hours, preferably between 4 to 8 hours and stirred;

(v) aggregate(s) are mixed with digestate additive to reach the desired concentration, of about 0.5%, 1%, 5%, 10%, 15%, 20%, 25%, 30%, 35%, 40%, 45%, 50%, 55%, 60%, 65% or 70% of digestate additive by weight of said asphalt mixture composition;

(vi) binder is added to the mixture, and mixed typically until the aggregate(s) is/are entirely coated with said binder(s).

The mixing container may be previously heated e.g. to about 155±25° C. and the obtained asphalt mixture composition is further compacted.

For the purpose of measuring wheel rutting of an asphalt mixture composition, as in Example 4.1, compaction can e.g. be made by roller compaction according to EN 12697-33, using a roller running on vertical sliding steel plates to produce specimens of 200 mm in diameter.

For the purpose of measuring water sensitivity of an asphalt mixture composition, as in Example 4.2, compaction can e.g. be made according to EN 12697-30:2012 with 50 blows on each side.

For the purpose of measuring indirect tension to determine stiffness modulus of an asphalt mixture composition, as in Example 4.3, compaction can e.g. be performed by gyratory compaction according to EN 12697-31:2007.

Said binder is preferably bitumen or polymer modified bitumen (PmB) or a mixture thereof.

Polymer Modified Bitumen (PmB) Further Modified with Digestate Additive

The main asphalt binder modification has been carried out by the addition of polymers, as for example styrene-butadiene-styrene (SBS), which have enhanced asphalt binder service properties such as mechanical resistance, temperature susceptibility, adhesion and elasticity. However, the high prices of these petroleum-derived products in relation to the bitumen, limits its concentration in the bituminous matrix.

In order to address these price limitations, mitigate the hazardous emission derived from polymer production while maintaining both mechanical and rheological modified binder properties, the addition of new additives should be studied.

A polymer modified bitumen may be obtained by modification of bitumen with a 'thermoplastic elastomer' which is meant to comprise compounds such as styrene-butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (IIR), polyisobutene (PIB), polybutadiene (PBD), polyisoprene (PI), including any combination thereof.

Furthermore, bitumen modifier agents were found to be easily incorporated into bitumen and reach viscosity values which allow manufacturing, paving and compacting asphalt mixture compositions using conventional asphalt plants and paving equipment. In addition, the modified bitumen is storage stable, in order to avoid settling problems in the storage binder tank as well as other properties such as resistance to ultraviolet radiation, thermal susceptibility and waterproofing properties.

It was observed that a polymer modified bitumen further modified with about 0.5%, 1%, 5%, 10%, 15%, 20%, 25%, 30%, 35%, 40%, 45%, 50%, 55%, 60%, 65% or 70% of digestate additive by weight of said asphalt mixture composition increase elastic recovery, according to EN 13398, of an asphalt composition comprising it, in more than 50%. Furthermore, the cohesion of said polymer modified bitumen further modified with digestate additive was above 2 $J/cm^2$.

Definitions

In the context of the present invention, the terms "aggregate(s)" or "filler(s)" can be used interchangeably and are meant to comprise the largest constituent in asphalts, typically, but not exclusively e.g. 92-96% by mass. The type of aggregate, its mineralogy, and physical and chemical properties is believed to have a significant impact on asphalt performance. Suitable aggregates, and their properties, for use in conforming to European asphalt mixture compositions can be specified according to national or regional standards, such as EN 13043 (BSI, 2002). This standard defines aggregate as a 'granular material used in construction', and separates this into one of three types (i) natural, (ii) manufactured, (iii) recycled aggregates, described as follows: (i) natural aggregate: 'aggregate from mineral sources that has been subjected to nothing more than mechanical processing' (e.g. crushed rock, sands and gravel, often referred to as primary aggregate); (ii) Manufactured aggregate: 'aggregate of mineral origin resulting from an industrial process involving thermal or other modification' (e.g. blast furnace slag); and (iii) recycled aggregate: 'aggregate resulting from the processing of inorganic or mineral material previously used in construction' (e.g. reclaimed asphalt).

Further categorisation of aggregates can be given by the description for particle size: (i) coarse aggregate: substantially retained on a 2 mm test sieve; (ii) fine aggregate: substantially passing a 2 mm test sieve; (iii) all-in aggregate: a combination of coarse and fine aggregates; and (iv) filler aggregate: substantially passing a 0.063 mm test sieve. Rock-types suitable as aggregate(s) are meant to comprise (i) igneous, (ii) sedimentary, and/or (iii) metamorphic rock. Increasing environmental awareness in recent years has generated considerable interest not only in recycling but also in the use of so called 'secondary aggregates'—materials such as slate waste, china clay waste and PFA/fly ash—in road construction. Many of these materials, with appropriate technical properties, are used as fill, capping or sub-base aggregates and recent developments have seen slate and china clay wastes used as aggregate in asphalt mixture compositions.

Crushed concrete is also used for fill, capping or sub-base, while old asphalt removed from existing roads during maintenance can be used as part of the 'aggregate' in a new asphalt mixture composition. For use in road making, indeed for most uses in civil engineering, the quality of aggregates must be closely controlled.

For roads, the most significant properties are:
- size: the 'grading' of an aggregate mixture signifies the proportion of the different standard sizes in the mixture and largely determines its main properties;
- shape: this is important for the mechanical interlock of aggregate layers; 'flakiness' is a measure of the extent to which individual chippings are angular, but roughly equi-dimensional particles are preferred;
- strength: the resistance to crushing/fragmentation;
- surface characteristics: good resistance to 'polishing' and abrasion under traffic are important requirements for aggregates to be used in surface courses to ensure adequate skid resistance and resistance to wear.

These properties are characterised by Polished Stone Value (PSV) and Aggregate Abrasion Value (AAV) respectively. Specifications for aggregates for use in asphalt are now given in European Standard BS EN 13043 with guidance on the use of this standard being given in BSI Published Document PD 6682-2. Most test methods for aggregate properties are laid down in individual parts of European Standards BS EN 932 and BS EN 933.

Appropriate limits for quality using these tests are found in the relevant European or British Standard (or other specification) for the particular road construction product concerned.

The term "about" as used herein, usually with reference to a quantitative number or range, may refer to +/−1, 2, 5 or even 10% in relative terms of the number or range referred to. "about", "around", "approximately" or the symbol "~" can be used interchangeably, and are meant to comprise variations generally accepted in the field, e.g. comprising analytical errors and the like. Thus "about" may also indicate measuring uncertainty commonly experienced in the art, which can be in the order of magnitude of e.g. +/−1, 2, 5, 10, 20, or even 50 percent.

"Additive" or "filler" may be used interchangeably within the present invention. A "filler" is typically an inert material added to reduce the amount of other, more expensive or difficult to work with or otherwise challenging, material (e.g. Renescience digestate ash). An "additive" is typically an active component, improving the properties of an asphalt composition comprising it (e.g. Renescience digestate additive). Any digestate additive, as described in the present invention, may also act as a filler, not changing the properties of the asphalt composition comprising it.

"Anaerobic digester digestate" or "AD digestate" is defined as the residual output from an anaerobic digestion (AD) used for biogas production and for removal of organic content from bioliquid. Anaerobic digesters sustainably treat organic waste e.g. from municipal, industrial, and/or agricultural operations with microorganisms under anaerobic conditions for production of biogas. Usually, the "AD digestate" has alkaline pH, and comprises low water content, non-degradable organics, suspended solids and dissolved matter such as dissociated salts.

"Anaerobic digestion system" or "AD system" refers to a fermentation system comprising one or more reactors operated under anaerobic conditions in which methane gas is produced in each of the reactors. Methane gas is produced to the extent that the concentration of dissolved methane in the aqueous phase of the fermentation mixture within the "AD system" is saturated at the conditions used and methane gas is emitted from the system. The "AD system" may be a fixed filter system. A "fixed filter AD system" refers to a system in which an anaerobic digestion microbial consortium is immobilized, optionally within a biofilm, on a physical support matrix.

In the context of the present invention, the term "anti-foaming agent(s)" is meant to comprise one or more compounds and/or compositions, often silicone-based, such as active silicone polymers, siloxane polymers, organo-modified siloxanes, but also non-silicone compounds/compositions comprising polypropylene based polyether dispersions, fatty acid-type antifoams, non-ionic emulsifiers. A variety of anti-foaming agent(s) are commercially available and are effective in preventing and/or reducing foaming, and/or decreasing the half-life of foam significantly in bitumen- and/or asphalt-based applications.

In the context of the present invention, the term "active component" is meant to comprise e.g. dispersing agent(s), surfactant(s), hydrotropic agent(s), emulsifier(s), preserving agent(s), anti-foaming agent (s), viscosity modifier(s), reactive polymer(s) and any combination thereof.

For the purpose of the present invention, asphalt composition, asphalt concrete, asphalt mixture composition, asphalt mixture, asphalt mix, asphalt pavement or simply asphalt means a composition comprising at least one aggregate, optionally at least one filler, at least one additive and at least one binder, such as bitumen and/or other, in varying amounts and relative percentages. The term 'asphalt' is herein also used to describe the wide range of mixtures of, at least, bituminous binder and aggregate individually known as Hot Rolled Asphalt (HRA), Stone Mastic Asphalt (SMA), proprietary Thin Surfacings, Mastic Asphalt, Asphalt Concrete etc., which are available for use in constructing and maintaining paved areas. Asphalt pavements are frequently described as flexible pavements, implying their ability to absorb the stresses imposed by traffic and weather, without cracking. An asphalt mixture composition according to the present invention is suitable for building roads, pavements and paved areas, roofing, vehicle parking areas, house-drives, footways, recreation areas such as tennis courts or playgrounds, agricultural uses such as farm roads or animal cubicles, airfields, runways and access roads, hard standings, storage areas, hydraulic applications such as dam construction, coastal protection or other.

Binder as the name implies, when used in asphalt mixture compositions binds the aggregate particles into a cohesive mixture, whilst also lubricating the particles when hot to assist in compaction. According to the type of mixture and its end use, the amount of binder used will typically vary between 3 and 9 percent by mass of the mixture. Bituminous binders are characterised by being black, sticky and thermoplastic, i.e. they become softer and more fluid when they are heated, and harden again when they cool.

Petroleum bitumen, derived from the refining of certain types of crude oil is the predominant binder. Bitumens are produced in several different forms:
- Paving grade bitumens, relatively hard bitumens, denoted by their permissible range of penetration value (e.g. 40/60, 100/150 pen grade), which is the depth in tenths of a millimetre to which a standard needle penetrates into the bitumen in 5 seconds under a load of 100 g at a temperature of 25° C.;
- Hard paving grade bitumens, 'stiffer' grades of bitumen (10/20 and 15/25 pen) for use in highway asphalts subject to very high traffic and/or imposed loadings, typically used in base and binder course asphalts e.g. EME2;
- Cutback bitumens, in which the viscosity of paving grade bitumen is reduced to make it more convenient to use at lower temperatures than for paving grade bitumen, by blending it with volatile oils (blending is often undertaken in the mixer on the asphalt plant. Asphalts manufactured using cutback bitumens are used predominantly for temporary re-instatements;

Bitumen emulsions, in which paving grade bitumen is dispersed in water in the form of very small globules, again to make it convenient to use cold or, with some emulsions, at lower temperatures than for paving grade bitumen; the bitumen is held in suspension by the use of special emulsifying agents.

Modified bitumens, bitumens blended with suitable modifiers such as polymers, to provide enhanced properties to the asphalt mixture compositions in which they are used;

Bitumen mixtures i.e. blends of bitumen and Trinidad Lake Asphalt (TLA), which are usually blended at the asphalt plant.

Of these, by far the most commonly used bitumens for producing asphalt mixture compositions are the paving grade bitumens, the actual penetration grade being chosen to suit the use to which the surfacing is to be put. Recently, specially developed bitumen emulsions have been introduced for producing high strength coldmix asphalts as alternatives to the traditional hot mixtures. Emulsions are also used as tack and bond coats under new asphalt surface courses and in some circumstances between other asphalt layers. The less viscous cutbacks are used in making patching materials which are to be stored for a period before use.

The various grades of bitumen are specified in BS EN 12591 for paving (penetration) grade bitumens, BS 3690 Part 1 for cut-back bitumens and BS 3690 Part 3 for bitumen/TLA blends. Appropriate grades for different asphalt uses are laid down in the British Standards for the asphalt mixture compositions (see below). The various grades of bitumen emulsion are specified in BS EN 13808 (cationic) and BS 434 Part 1 (Anionic).

The European Specification covering modified bitumens is BS EN 14023. Most of these binders are produced as proprietary materials with their selection being based on past experience and desired end performance properties of the mixture.

In the context of the present invention, the term 'bitumen' is also meant to comprise a hydrocarbon product produced from the refining of crude oil. This is commonly achieved by removing the lighter fractions (such as liquid petroleum gas, petrol and diesel) from crude oil during the refining process. In North America, bitumen is commonly known as asphalt binder or asphalt, which occasionally may bring uncertainty to the definition.

"Biodegradable matter" refers to organic matter that can be partly or completely degraded into simple chemical compounds such as mono-, di- and/or oligo-saccharides, amino acids and/or fatty acids by microorganisms and/or by enzymes. Biodegradable matter is generally organic material that provides a nutrient for microorganisms, such as mono-, poly- or oligosaccharides, fat and/or protein. These are so numerous and diverse that a huge range of compounds can be biodegraded, including hydrocarbons (oils), polycyclic aromatic hydrocarbons (PAHs), polychlorinated biphenyls (PCBs) and pharmaceutical substances. Microorganisms secrete biosurfactant, an extracellular surfactant, to enhance this process.

"Bioliquid" is the liquefied and/or saccharified degradable components obtained by enzymatic hydrolysis of waste comprising organic matter. Bioliquid also refers to the liquid fraction obtained by enzymatic hydrolysis of waste comprising organic matter once separated from non-fermentable solids. Bioliquid comprises water and organic substrates such as protein, fat, galactose, mannose, glucose, xylose, arabinose, lactate, acetate, ethanol and/or other components, depending on the composition of the waste (the components such as protein and fat can be in a soluble and/or insoluble form). Bioliquid comprises also fibres, ashes and inert impurities. The resulting bioliquid comprising a high percentage of microbial metabolites provides a substrate for gas production, a substrate suitable for anaerobic digestion e.g. for the production of biogas.

"Brine" is defined as the residual output from one or more water purification treatments of reject water to obtain a water fraction having improved purity. Brine is typically saturated with or strongly impregnated with various salts.

Cellic® CTec 3 (Novozymes A/S) is a highly efficient cellulase and hemicellulase complex that works on a variety of substrates, including acid, auto-hydrolyzed, and alkaline pretreated substrates. Optimal performance of Cellic CTec3 occurs at a temperature range of 50-55° C. and at pH 4.75-5.25. The optimal conditions can vary with specific pretreated substrates and process conditions (e.g. solids content and hydrolysis time).

"Cohesion" means energy per unit area required to fully detach a cube from the support, with the previously-bonded faces of cube and support remaining fully covered by binder determined according to EN 13588:2017.

"Comprising" is to be interpreted as specifying the presence of the stated parts, steps, features, components, or the like, but does not exclude the presence of one or more additional parts, steps, features, components etc. For example, a composition comprising a chemical compound may thus comprise additional chemical compounds. It can differ in one or more atoms, functional groups, or substructures, which are replaced with other atoms, groups, or substructures.

"Concurrent microbial fermentation and enzymatic hydrolysis" degrades biopolymers into readily usable substrates and, further, achieves metabolic conversion of primary substrates to short chain carboxylic acids such as glucose, xylose, arabinose, lactate, mannose, galactose, acetate and/or ethanol. Protein and/or fat is also at least partly degraded.

"Renescience digestate", for the purpose of the present invention, is sometimes called "raw digestate" or "AD digestate" or "AD effluent". These terms can be used interchangeably and refers to the waste product from anaerobic digestion, wherein the substrate for the AD process is bioliquid generated by the "Renescience Technology". The Renescience digestate comprises both solids and liquids and these fractions may be used for various purposes. The solid-liquid separations can for instance be done by decantation, centrifugation and/or sedimentation. Usually, Renescience digestate comprises mainly water, wherein the raw digestate from the AD has a total solid content of about 4-8% and after the dewatering the solid digestate has a total solid content of 25-30% by weight, the rest being water. It also comprises non-degradable organics, suspended solids and dissolved matter such as dissociated salts and has alkaline pH.

Renescience digestate additive" for the purpose of the present invention means digestate derived from Renescience digestate obtained by the Renescience technology by drying said Renescience digestate (e.g. up to about 105° C.) until having between 0-20% moisture (preferably between 0-10% moisture), which may be grounded into powder (in one embodiment grinding is part of the drying process) and which has been prepared for, e.g., addition to binder mixtures and/or asphalt mixture compositions. An example of said preparation means adjusting the moisture content and particle size as described in Examples. Said Renescience digestate additive can also mean a mixture of Renescience digestate additive with a different digestate additive and/or other materials, e.g. CaCO3. Renescience digestate additive can in a specific embodiment be in the form of granulates and/or pellets.

"Renescience digestate ash" for the purpose of the present invention means Renescience digestate which has been prepared for, e.g., addition to binder mixtures eg. by means of mono incineration and/or other thermal process such as pyrolysis or gasification, as a filler agent.

"Renescience technology" means a biological treatment of waste such as MSW comprising enzymatic treatment from e.g. one or more added enzymes and/or microbial treatment in order to liquefy and/or saccharify the organic fraction in the waste to generate a bioliquid suitable for anaerobic digestion. The Renescience technology is exemplified in WO2014/198274 and WO2013/18778 and is further detailed in the background art and description of the present invention "Sewage sludge digestate additive" and "Food waste digestate additive" means any digestate derived from an AD process of sewage sludge and food waste, respectively. In a specific embodiment sewage sludge digestate additive and food waste digestate addition means digestate additives as obtained in Example 1.

Digestate or digestate additive, for the purpose of the present invention, can be any type of digestate. In one embodiment of the invention the digestate is derived from an AD process. In a preferred embodiment of the invention the digestate or digestate additive comprises at least one of Renescience® digestate additive, Renescience® digestate ash, sewage sludge digestate additive and/or food waste digestate additive.

"Dry matter," also appearing as "DM", refers to total solids, both soluble and insoluble, and effectively means "non-water content." Dry matter content is measured by drying at approximately between 60 to 105° C. until constant weight is achieved. In a preferred embodiment, dry matter content is measured by drying at approximately 105° C. The lower temperature range is used when the analysis substrate contains volatile compounds which may escape when boiling water and decrease the analysis result accuracy.

"Elastic recovery" is expressed as a percentage of the distance between the ends of the half-threads, which has developed 30 min after cutting relative to the elongation length, which is in general 200 mm. Determined according to EN 13398:2017.

"Enzyme" is a protein which has a catalytic function, meaning that it increases the rate of chemical reaction without undergoing any overall chemical change on itself in the process. Based on the classification by the Enzyme Commission (EC), there are six main classes of enzymes which catalyse different types of reaction, namely oxidoreductases (EC 1.X.X.X), transferases (EC 2.X.X.X), hydrolases (EC 3.X.X.X), lyases (EC 4.X.X.X), isomerases (EC 5.X.X.X) and ligases (EC 6.X.X.X). Enzymes involved in the liquefaction and/or saccharification of organic materials mostly belong to the third category (EC 3.X.X.X). These enzymes facilitate the hydrolysis reaction, i.e. the splitting of chemical bond with the participation of water as co-substrate. The enzymes in this category are usually named according to the substrate that they hydrolyse: Amylase(s) hydrolyse starch (amylose and amylopectin), cellulase(s) hydrolyse cellulose, hemicellulase(s) hydrolyse hemicellulose, pectinase(s) hydrolyse pectins, lipase(s) hydrolyse lipids, and protease(s) hydrolyse proteins. Some of the hemicellulase(s) are esterase(s), performing catalysis on ester bonds similar as in the case of lipase(s). Some pectinase(s) are lyases which remove chemical group using non-hydrolytic reactions. Recently, a new enzyme class termed lytic polysaccharide monooxygenase (LPMO) which has catalytic activity on cellulose was discovered (Quinlan et al., 2011, Proc. Natl. Acad. Sci. USA 208: 15079-15084; Phillips et al., 2011, ACS Chem. Biol. 6: 1399-1406; Lin et al., 2012, Structure 20: 1051-1061). LPMOs catalyse oxidative cleavage of cellulose with either oxygen or hydrogen peroxide as co-substrate and were grouped under auxiliary activity 9 polypeptide. Another oxidative enzyme belonging to other class, such as catalase (EC 1.11.1.6), catalyse the conversion of hydrogen peroxide to water and oxygen.

"Enzymatic hydrolysis" is preferably carried out in a suitable aqueous environment under conditions that can be readily determined by one skilled in the art. In one aspect, hydrolysis is performed under conditions suitable for the activity of the enzymes(s), i.e., optimal for the enzyme(s). In one aspect, the liquefaction and/or saccharification is performed in the presence of dissolved oxygen at a concentration of at least 0.1% of the saturation level, such as at least 0.2%, 0.3%, 0.4% or 0.5% of the saturation level.

"Fermentation" and "digestion" can be used interchangeably. "Digestion" is commonly used for anaerobic digestions, often in the context of biogas production. "Fermentation" or "fermentation process" refers to any fermentation process or any process comprising a fermentation step. Fermentation processes also include fermentation processes used in the consumable alcohol industry (e.g., beer and wine), dairy industry (e.g., fermented dairy products), leather industry, and tobacco industry. The fermentation conditions depend on the desired fermentation product and fermenting organism and can easily be determined by one skilled in the art.

"Hydrolysis" is meant to be related to the context wherein the municipal solid waste material is hydrolyzed to break down cellulose and/or hemicellulose and other substrates to fermentable sugars, such as glucose, cellobiose, xylose, xylulose, arabinose, mannose, galactose, and/or soluble oligosaccharides (also known as saccharification). The hydrolysis is performed enzymatically by one or more enzyme compositions in one or more stages. In the hydrolysis step, the municipal solid waste material, e.g., pre-treated, is hydrolyzed to break down proteins and lipids (e.g. triglycerides) found in the waste. The hydrolysis can be carried out as a batch process or series of batch processes. The hydrolysis can be carried out as a fed batch or continuous process, or series of fed batch or continuous processes, where the municipal solid waste material is fed gradually to, for example, a hydrolysis solution comprising an enzyme composition. The hydrolysis may be continuous hydrolysis in which a MSW material and an enzyme composition are added at different intervals throughout the hydrolysis and the hydrolysate is removed at different intervals throughout the hydrolysis. The removal of the hydrolysate may occur prior to, simultaneously with, or after the addition of the cellulosic material and the cellulolytic enzymes composition.

"Large-scale industrial applications" refers to an industrial waste treating process wherein at least about 5, 10, 20, 30, 40, 50, 60, 70, 80, 90, 100, 200, 500 kg or 1, 5, 10, 15, 20, 25, 50, or 100 tons (t) waste can be processed per h.

"Large-scale plant" is a plant wherein waste is processed at a commercial scale; wherein the plant normally operates continuously for at least 5 to 8 hours, and up to approximately 24 h, 36 h, 72 h or 96 h periods typically followed by the next continuous period; wherein waste collected from different sources are processed; and wherein each batch of waste entered into the plant can be defined by the way the waste enters the plant, such a one or more loads of a specific size, such as a load of e.g. 5-10 m3, 10-15 m3 or 15-20 m3 waste disposal, or of a specific weight of the waste disposal, such as the weight of one or more loads such as truck loads or conveyor belt loads. Optionally, the large scale plant also comprises means for "waste-to-energy" transformation or is connected to means for "waste-to-energy" transformation, such as means for the production of biogas, bioethanol, syngas, heat or electricity.

"Microbial enzymes", includes any enzyme such as cellulase(s), hemicellulase(s) and/or starch degrading enzyme(s), that can be expressed in suitable microbial hosts using methods known in the art. Such enzymes are also commercially available, either in pure form or in enzyme cocktails. Specific enzyme activities can be purified from commercially available enzyme cocktails, again using methods known in the art—see e.g. Sorensen et al. (2005) "Efficiencies of designed enzyme combinations in releasing arabinose and xylose from wheat arabinoxylan in an industrial fermentation residue" (Enzyme and Microbial Technology 36 (2005) 773-784), where a *Trichoderma reesei* beta-xylosidase is purified from Celluclast (Finizym), and further commercial enzyme preparations are disclosed.

"Municipal solid waste" (MSW)" refers to waste fractions which are typically available in a city, but that need not come from any municipality per se, i.e., MSW refers to every solid waste from any municipality but not necessarily being the typical household waste—could be waste from airports, universities, campus, canteens, general food waste, among others. MSW may be any combination of one or more of cellulosic, plant, animal, plastic, metal, or glass waste including, but not limited to, any one or more of the following: Garbage collected in normal municipal collections systems, optionally processed in a central sorting, shredding or pulping device, such as e.g., a Dewaster® or a reCulture®; solid waste sorted from households, including both organic fractions and paper rich fractions; Generally, municipal solid waste in the Western part of the world normally comprise one or more of: animal food waste, vegetable food waste, newsprints, magazines, advertisements, books and phonebooks, office paper, other clean paper, paper and carton containers, other cardboard, milk cartons and alike, juice cartons and other carton with alu-foil, kitchen tissues, other dirty paper, other dirty cardboard, soft plastic, plastic bottles, other hard plastic, non-recyclable plastic, yard waste, flowers etc., animals and excrements, diapers and tampons, cottonsticks etc., other cotton etc., wood, textiles, shoes, leather, rubber etc., office articles, empty chemical bottles, plastic products, cigarette buts, other combustibles, vacuum cleaner bags, clear glass, green glass, brown glass, other glass, aluminium containers, alu-trays, alu-foil (including tealight candle foil), metal containers (—Al), metal foil (—Al), other sorts of metal, soil, rocks, stones and gravel, ceramics, cat litter, batteries (botton cells, alkali, thermometers etc.), other non-combustibles and fines.

"Organic" refers to materials that comprises carbon and are bio-degradable and include matter derived from living organisms. Organic material can be degraded aerobically (with oxygen) or anaerobically (without oxygen). Decomposition of biodegradable substances may include both biological and abiotic steps.

"Penetration of a binder" consistency, expressed as the distance in tenths of a millimetre that a standard needle will penetrate vertically into a sample of the material under specified conditions of temperature, load and loading duration determined according to EN 1426:2015.

"Percentage (%)" In the context of the present invention, unless indicated otherwise, "%" indicates % weight/weight (w/w).

In the context of the present invention, the term "plasticity modifying agent(s)" is meant to comprise one or more of plastomer, thermoplastic elastomer, rubber, viscosity modifier, and reactive polymer.

In the context of the present invention, the term "plastomer" is meant to comprise compounds such as ethylene-vinyl acetate (EVA), ethylene-methyl acrylate (EMA), ethylene-butyl acrylate (EBA), atactic polypropylene (APP), polyethylene (PE), polypropylene (PP), polyvinyl chloride (PVC), and polystyrene (PS), including any combination thereof.

In the context of the present invention, the term 'reactive polymer(s)' is meant to comprise compounds such as one or more random terpolymer of ethylene, acrylic ester and glycidyl methacrylate, or maleic anhydride-grafted styrene-butadiene-styrene copolymer, including any combination thereof.

In the context of the present invention, the term 'thermoplastic elastomer' is meant to comprise compounds such as styrene-butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (IIR), polyisobutene (FIB), polybutadiene (PBD), polyisoprene (PI), including any combination thereof.

In the context of the present invention, the term 'rubber(s)' is meant to comprise crumb rubber, rubber from used tyres, recycled rubber, natural rubber, rubber latex, and the like.

"Reject water" is defined as the liquid fraction obtained after one or more solid-liquid separations of the AD digestate.

"Rut depth" is the reduction in the thickness of a test specimen asphalt mixture composition, in millimetres or percentage, relative to the specimen original thickness, caused by repeated passes of a loaded wheel according to describe procedure in EN 12697-22:2003+A1:2007.

"2D/3D Separation" is achieved in one or more steps. In one embodiment first, a ballistic separator removes two streams of non-degradable materials, producing a 2D fraction comprising plastic bags and other generally formless material, a 3D fraction comprising bottles and containers having a definite shape, and a volume of a biogenic liquid slurry of bio-degradable components. In a second step of this embodiment, the 2D fraction is further subject to pressing with a screw press or similar device to further increase the yield of the biogenic slurry. The 2D fraction may be further subject to washing, in order to further recover bio-degradable material.

"Softening point of a binder" is the temperature at which a material under standardised test conditions described in EN 1427:2015 attains a specific consistency.

"Solid/liquid separation" refers to an active mechanical process, and/or unit operation(s), whereby liquid is separated from solid by application of some force through e.g. pressing, centrifugation, sedimentation, decanting or the like. Commonly, a solid/liquid (s/l) separation provides a liquid and solid fraction.

"Sorted", refers to a process in which waste, such as MSW, is substantially fractionated into separate fractions such that organic material is substantially separated from plastic and/or other non-biodegradable material.

"Sorted waste" (or "sorted MSW") as used herein refers to waste in which approximately less than 30%, preferably less than 20% and most preferably less than 15% by weight of the dry weight is not biodegradable material.

"Stiffness modulus" is a parameter expressing the relationship between stress and strain when submitting a linear visco-elastic material to a sinusoidal load wave. Stiffness modulus can be determined according to EN 12697-26: 2012.

"Unsorted" refers to that the waste or the MSW is not substantially fractionated into separate fractions such that organic material is not substantially separated from plastic and/or other inorganic material, notwithstanding removal of some large objects or metal objects and not withstanding some separation of plastic and/or other inorganic material may have taken place. The terms "unsorted waste" (or "unsorted MSW"), as used herein, refers to waste comprising a mixture of biodegradable and non-biodegradable material in which 15% by weight or greater of the dry weight is non-biodegradable material. Waste that has been briefly sorted yet still produce a waste (or MSW) fraction that is unsorted. Typically, unsorted MSW may comprise organic waste, including one or more of food and kitchen waste; paper- and/or cardboard-comprising materials; recyclable materials, including glass, bottles, cans, metals, and certain plastics; burnable materials; and inert materials, including ceramics, rocks, and debris. The recyclable material might be before or after source sorting.

In the context of the present invention, the term 'viscosity modifier(s)' is meant to comprise one or more flux oil (aromatics, napthenics, parrafinics), or Fischer-Tropsch waxes, including any combination thereof.

"Waste" comprises, sorted and unsorted, municipal solid waste (MSW), agriculture waste, hospital waste, industrial waste, e.g., waste fractions derived from industry such as restaurant industry, food processing industry, general industry; waste fractions from paper industry; waste fractions from recycling facilities; waste fractions from food or feed industry; waste fraction from the medicinal or pharmaceutical industry; waste fractions from hospitals and clinics, waste fractions derived from agriculture or farming related sectors; waste fractions from processing of sugar or starch rich products; contaminated or in other ways spoiled agriculture products such as grain, potatoes and beets not exploitable for food or feed purposes; or garden refuse.

"Waste fractions derived from households" comprises unsorted municipal solid waste (MSW); MSW processed in some central sorting, shredding or pulping device such as e.g. Dewaster® or reCulture®; Solid waste sorted from households, including both organic fractions and paper rich fractions; RDF (Refuse-Derived-Fuel); fraction derived by post treatment as e.g inerts, organic fractions, metals, glass, and plastic fractions. In a preferred embodiment a 2D and 3D fraction is prepared. The 2D fraction can be further separated into recyclables and/or residuals such as SRF (Solid Recovered Fuel), RDF (Refused Derived Fuel) and/or inerts. The 3D fraction can also be further separated into recyclables and/or residuals such as metals, 3D plastic and/or RDF.

"Waste fractions derived from the industry" comprises general industry waste fractions comprising paper or other organic fractions now being treated as household waste; waste fraction from paper industry, e.g. from recycling facilities; waste fractions from food and feed industry; waste fractions from the medicinal industry, hospital and clinic waste, airport waste, other public and private services derived waste.

"Waste fractions derived from agriculture or farming related sectors" comprises waste fractions from processes including sugar or starch rich products such as potatoes and beet; contaminated or in other ways spoiled agriculture products such as grain, potatoes and beet not exploitable for food or feed purposes; garden refuse; manure, or manure derived products "Waste fractions derived from municipal, county or state related or regulated activities" comprises sludge from waste water treatment plants; fibre or sludge fractions from biogas processing; general waste fractions from the public sector comprising paper or other organic fractions.

Water sensitivity is a measure for the susceptibility of asphalt towards water damage. It is measured by determining the ratio between the indirect tensile strengths of a water conditioned subset of samples with the indirect tensile strength of a dry subset. If the ratio between these indirect tensile strengths are low, it indicates that the asphalt is more susceptible to water damage compared to asphalt with a high ratio for water sensitivity.

Water sensitivity is calculated through the Indirect Tensile Strength Ratio (ITSR), i.e. the ratio of the indirect tensile strength of wet (water conditioned) specimens to that of dry specimens, expressed in percent and determined according to EN 12697-12:2008.

In the context of the present invention, the term "whole slurry" is meant to comprise a process, wherein pretreated biomass can be used directly in a subsequent hydrolysis step, such as an enzymatic hydrolysis and/or fermentation, such as e.g. disclosed in PCT/DK2014/050030, filed on 5 Feb. 2014, published as WO2015/014364, herewith incorporated by reference in its entirety.

Rut depth is the measure of the depth of the rut a wheel makes in the asphalt after running back and forth a set number of times.

Particular Embodiments

1. Asphalt mixture composition comprising a, at least one, binder, aggregate and additive, characterized by said, at least one, additive being digestate.
2. Asphalt mixture composition according to embodiment 1 wherein digestate additive is obtained from an anaerobic digestion process.
3. Asphalt mixture composition according to embodiments 1-2, wherein said composition further comprises at least one filler.
4. Asphalt mixture composition according to embodiments 1-3 wherein digestate additive is Renescience® digestate additive, sewage sludge digestate additive and/or food waste digestate additive.
5. Asphalt mixture composition according to embodiments 1-2 wherein said additive is Renescience digestate or a derived fraction thereof.
6. Asphalt mixture composition according to embodiments 1-5 wherein digestate additive is Renescience® digestate additive, i.e., comprises both solids and liquids, low water content, non-degradable organics by anaerobic digestion, suspended solids and dissolved matter such as dissociated salts, has alkaline pH and is obtained by Renescience® technology, i.e., mixing waste comprising organic matter, such as ordinary unsorted and/or sorted/partially sorted household waste, with water, enzymes and optionally microorganisms in order to liquefy and/or saccharify organic waste such as food waste, cardboard, paper, labels and similar, and turn it into a bioliquid that can be used for production of biogas via an anaerobic digestion process.

7. Asphalt mixture composition according to the previous embodiments wherein the binder is a bituminous binder, such as petroleum bitumen, paving grade bitumen, hard paving grade bitumen, cutback bitumen, bitumen emulsion, modified bitumen and/or a bitumen mixture.

8. Asphalt mixture composition according to embodiments 1-5 wherein the binder is tar and/or other non-bituminous binder.

9. Asphalt mixture composition according to the previous embodiments wherein digestate additive is intermixed within said composition, replacing part of the binder.

10. Asphalt mixture composition according to the previous embodiments, wherein digestate additive replaces the binder up to about 0.5%, 1%, 5%, 10%, 15%, 20%, 25%, 30%, 35%, 40%, 45%, 50%, 55%, 60%, 65% or 70% by weight of the asphalt mixture composition.

11. Asphalt mixture composition according to the previous embodiments, wherein digestate additive replaces about 11% or about 22% by weight of the binder.

12. Asphalt mixture composition according to the previous embodiments, wherein said, at least one, binder is a bituminous binder.

13. Asphalt mixture composition according to the previous embodiments wherein binder is bitumen and preferably comprises between 0% and 20%, most preferably about 5%, 10% or 15% by weight of Renescience® Digestate Additive.

14. Asphalt mixture composition according to the previous claims, wherein the binder is modified with at least one polymer, such as polymer modified bitumen (PmB), and further modified up to about 0.5%, 1%, 5%, 10%, 15%, 20%, 25%, 30%, 35%, 40%, 45%, 50%, 55%, 60%, 65% or 70% by weight of said asphalt composition comprising said binder modified with a, at least one, polymer.

15. Asphalt mixture composition according to embodiment 12, wherein the polymer is styrene-butadiene-styrene (SBS).

16. Asphalt mixture composition according to embodiments 12-13, wherein the softening point of a binder modified with polymer and digestate additive is between about 1° C. and about 10° C. higher than that of the binder modified only with a polymer.

17. Asphalt mixture composition according to embodiments 12-14, wherein the foam is eliminated or significantly minimised when said asphalt composition comprises about 0.5%, 1%, 5%, 10%, 15%, 20%, 25%, 30%, 35%, 40%, 45%, 50%, 55%, 60%, 65% or 70% by weight of Renescience® digestate additive within said asphalt mixture composition.

18. Asphalt mixture composition according to the previous embodiments wherein it is suitable for use in one or more of the following layers, from the superior layer to the inferior layer in a road construction:
a) surface course
b) binder course
c) base course
d) sub-base
e) subgrade 19. Asphalt mixture composition according to the previous embodiments wherein said composition further comprises plasticity modifying agents, such as one or more of plastomer, thermoplastic elastomer, rubber, viscosity modifier, and reactive polymer.

20. Asphalt mixture composition according to the previous embodiments wherein it further comprises other materials, such as recycled asphalt composition, recycled binder or other asphalt mixture composition components, salts, sewage sludge, sand, gravil, plastic, metal and/or other materials, preferably complying with EN 13108 or other applicable standars and methods.

21. Asphalt mixture composition according to the previous embodiments, such that when the binder comprises about 0.5%, 1%, 5%, 10%, 15%, 20%, 25%, 30%, 35%, 40%, 45%, 50%, 55%, 60%, 65% or 70% of digestate additive by weight of said asphalt mixture composition, said binder shows change in penetration of −80% to +80% relative to a comparable asphalt mixture composition where the binder comprises 0% of digestate additive by weight.

22. Asphalt mixture composition according to the previous embodiments, such that when the binder comprises about 0.5%, 1%, 5%, 10%, 15%, 20%, 25%, 30%, 35%, 40%, 45%, 50%, 55%, 60%, 65% or 70% of digestate additive by weight of said asphalt mixture composition, said binder shows change in penetration of −50% to +53% relative to a comparable asphalt mixture composition where the binder comprises 0% of digestate additive by weight.

23. Asphalt mixture composition according to embodiment 19, such that when the binder comprises about 0.5%, 1%, 5%, 10%, 15%, 20%, 25%, 30%, 35%, 40%, 45%, 50%, 55%, 60%, 65% or 70% of digestate additive by weight of said asphalt mixture composition, the penetration of said binder and the durability of said asphalt mixture composition increase in direct proportion to the concentration of digestate.

24. Asphalt mixture composition according to the previous embodiments, such that when the binder comprises about 11% by weight of digestate additive, said binder shows penetration about 53% higher than a comparable asphalt mixture composition where the binder comprises 0% of digestate additive by weight.

25. Asphalt mixture composition according to the previous embodiments, such that when the binder comprises about 0.5%, 1%, 5%, 10%, 15%, 20%, 25%, 30%, 35%, 40%, 45%, 50%, 55%, 60%, 65% or 70% of digestate additive by weight of said asphalt mixture composition, said binder shows a change in softening point of between −30% to 40% relative to a comparable asphalt mixture composition where the binder comprises 0% of digestate additive by weight.

26. Asphalt mixture composition according to the previous embodiments, such that when the binder comprises about 0.5%, 1%, 5%, 10%, 15%, 20%, 25%, 30%, 35%, 40%, 45%, 50%, 55%, 60%, 65% or 70% of digestate additive by weight of said asphalt mixture composition, said binder shows a change in softening point of between −8% to 16% relative to a comparable asphalt mixture composition where the binder comprises 0% of digestate additive by weight.

27. Asphalt mixture composition according to the previous embodiments, such that when the binder comprises about 11% by weight of digestate additive, said binder shows a softening point of about −8% relative to a comparable asphalt mixture composition where the binder comprises 0% of digestate additive by weight.

28. Asphalt mixture composition according to the previous embodiments wherein penetration and softening point of the binder in said composition, said binder comprising digestate additive, are directly proportional with the added amount of digestate additive.
29. Asphalt mixture composition according to the previous embodiments, said composition comprising about 0.5%, 1%, 5%, 10%, 15%, 20%, 25%, 30%, 35%, 40%, 45%, 50%, 55%, 60%, 65% or 70% of digestate additive by weight of said asphalt mixture composition and showing increase in indirect tensile strength of up to 50%, when wet conditioned, and up to 50%, when dry conditioned, relative to a comparable asphalt mixture composition where the binder comprises 0% of digestate additive by weight.
30. Asphalt concrete mixture composition according to the previous embodiments, said composition comprising about 0.5% by weight of digestate additive and showing an increase in indirect tensile strength of up to 26%, when wet conditioned, and up to 22%, when dry conditioned, relative to a comparable asphalt mixture composition where the binder comprises 0% of digestate additive by weight.
31. Asphalt mixture composition according to the previous embodiments, wherein said composition comprises up to 1% by weight of digestate additive and shows a change in stiffness modulus between about 13% and 241% relative to a comparable asphalt mixture composition where the binder comprises 0% of digestate additive by weight.
32. Asphalt mixture composition according to the previous embodiments, said asphalt mixture composition comprising about 0.5%, 1%, 5%, 10%, 15%, 20%, 25%, 30%, 35%, 40%, 45%, 50%, 55%, 60%, 65% or 70% of digestate additive by weight of said asphalt mixture composition and showing a change in stiffness modulus between 5% and 400% relative to a comparable asphalt mixture composition where the binder comprises 0% of digestate additive by weight.
33. Asphalt mixture composition according to the previous embodiments, said asphalt mixture composition comprising about 0.5% by weight of digestate additive and showing a change in stiffness modulus between about 13% and 78%% relative to a comparable asphalt mixture composition where the binder comprises 0% of digestate additive by weight.
34. Asphalt mixture composition according to the previous embodiments, wherein said composition comprises between 0.5% and 1.0% by weight of Renescience® digestate additive and shows a change in stiffness modulus between 13% and 241 relative to a comparable asphalt mixture composition where the binder comprises 0% of digestate additive by weight.
35. Asphalt mixture composition according to the previous embodiments, wherein said composition comprises about 0.5%, 1%, 5%, 10%, 15%, 20%, 25%, 30%, 35%, 40%, 45%, 50%, 55%, 60%, 65% or 70% of digestate additive by weight of said asphalt mixture composition and shows a rut depth up to 70% lower relative to a comparable asphalt mixture composition where the binder comprises 0% of digestate additive by weight.
36. Asphalt mixture composition according to the previous embodiments, wherein said composition comprises up to 1% by weight of digestate additive and shows a rut depth up to 38% lower relative to a comparable asphalt mixture composition where the binder comprises 0% of digestate additive by weight.
37. Asphalt mixture composition according to the previous embodiments, said asphalt mixture composition comprising about 0.5% by weight of digestate additive and showing a rut depth up to 38% lower relative to a comparable asphalt mixture composition where the binder comprises 0% of digestate additive by weight.
38. Asphalt mixture composition according to the previous embodiments, wherein said composition comprises between 0.5% and 1.0% by weight of Renescience® digestate additive and shows a rut depth up to 38% lower relative to a comparable asphalt mixture composition where the binder comprises 0% of digestate additive by weight.
39. Asphalt mixture composition according to the previous embodiments, such that when the binder comprises about 0.5%, 1%, 5%, 10%, 15%, 20%, 25%, 30%, 35%, 40%, 45%, 50%, 55%, 60%, 65% or 70% of digestate additive by weight of said asphalt mixture composition, said asphalt mixture composition showing an improvement in water sensitivity of up to 30% relative to a comparable asphalt mixture composition where the binder comprises 0% of digestate additive by weight.
40. Asphalt mixture composition according to the previous embodiments, such that when the binder comprises about 11% by weight of digestate additive, said asphalt mixture composition shows an improvement in water sensitivity of up to 14%.
41. Asphalt mixture composition according to the previous embodiments wherein Renescience digestate ash is a filler.
42. Method to manufacture an asphalt mixture composition comprising digestate additive, comprising the following steps:
    a) Providing the digestate additive;
    b) Providing the aggregate(s)
    c) Providing the binder(s);
    d) Mixing the aggregate(s) and binder(s) with digestate additive to obtain an asphalt mixture composition, characterized in, at least, one or more of:
    (i) the digestate additive, such as Renescience® digestate additive, food waste digestate additive and/or sewage sludge additive, is obtained by anaerobic digestion; and in that
    (ii) aggregates comprise less than 5%, less than 10%, less than 15% or less than 20% (w/w) moisture content;
    (iii) binder is heated to its reference compaction temperature (110±25° C.), between 1 to 12 hours, preferably between 4 to 8 hours and stirred;
    (iv) digestate additive achieves the desired concentration, up to about 0.5%, 1%, 5%, 10%, 15%, 20%, 25%, 30%, 35%, 40%, 45%, 50%, 55%, 60%, 65% or 70% of digestate additive by weight of said asphalt mixture composition;
    (v) mixing is performed until the aggregate(s) is/are entirely coated with said binder(s).
43. Method according to embodiment 42 wherein the mixing container is pre-heated to about 155±25° C.
44. Method according to embodiments 42-43 wherein the obtained asphalt mixture composition is further compacted.
45. Asphalt mixture composition characterized by being obtained directly from the method as mentioned in embodiments 42-44.

46. Use of digestate additive characterized by said digestate additive replacing about 0.5%, 1%, 5%, 10%, 15%, 20%, 25%, 30%, 35%, 40%, 45%, 50%, 55%, 60%, 65% or 70% by weight of said asphalt mixture composition and being used in the manufacturing of asphalt mixture compositions for building roads, pavements and paved areas, roofing, vehicle parking areas, housedrives, footways, recreation areas such as tennis courts or playgrounds, agricultural uses such as farm roads or animal cubicles, airfields, runways and access roads, hard standings, storage areas, hydraulic applications such as dam construction, coastal protection or other.

47. Use of asphalt mixture composition as mentioned in embodiments 1-41 and/or obtained according to embodiments 42-44 for building roads, pavements and paved areas, roofing, vehicle parking areas, housedrives, footways, recreation areas such as tennis courts or playgrounds, agricultural uses such as farm roads or animal cubicles, airfields, runways and access roads, hard standings, storage areas, hydraulic applications such as dam construction, coastal protection or other.

Further Embodiments of the Invention

In a first aspect, the present invention concerns a composition comprising a binder such as bitumen, digestate additive, and optionally one or more further component(s). Suitable further components may comprise e.g. aggregates, optionally one or more fillers, and/or one or more active component(s), such as e.g. one or more dispersing agent(s), surfactant(s), hydrotropic agent(s), emulsifier(s), preserving agent(s), anti-foaming agent (s), viscosity modifier(s), reactive polymer(s) and any combination thereof.

Such compositions can be suitable for construction work, e.g. in sealing work, road work, paving work, providing a surface layer, providing a sealing layer, providing a road and providing a pavement, providing a top layer of a road, and/or in a wide range of applications relating to e.g. (i) agriculture, (ii) buildings and industrial paving, (iii) hydraulics and erosion control, (iv) industrial, (v) paving, (vi) railways, and (vii) recreation.

In a second aspect, the present invention relates to the use of a composition according to the first, fourth or eighth aspect in one or more of: sealing work, road work, paving work, providing a surface layer, providing a sealing layer, providing a road and providing a pavement, providing a top layer of a road. Such uses may comprise applications relating to (i) agriculture, (ii) buildings and industrial paving, (iii) hydraulics and erosion control, (iv) industrial, (v) paving, (vi) railways, and (vii) recreation.

In a third aspect, the present invention concerns a sealing layer comprising a composition according to the first, fourth or eighth aspect of the invention. Such a sealing layer may be comprised in e.g. a roof, dam, pool, pond, lake, roof, bridge, tunnel, road, or the like.

In a fourth aspect, the present invention relates to an asphalt composition comprising a composition according to the first or eighth aspect of the invention. Such asphalt compositions comprise mineral aggregates, optionally fillers, and may comprise mastic asphalt or rolled asphalt.

In a fifth aspect, the present invention concerns a road and/or pavement comprising a composition according to the first, fourth or eighth aspect of the invention. Such roads usually comprise a surface layer and optionally one or more further layers, such as a binder layer, a base layer, and/or a sub base layer. Any of said layers may comprise a composition according to the first, fourth or ninth aspect.

In a sixth aspect, the present invention concerns construction work comprising the provision and/or use of a composition according to the first, fourth or eighth aspect of the invention, as well as uses according to the second or tenth aspect of the invention.

In a seventh aspect, the present invention pertains to a process for providing a composition according to the first, fourth or eighth aspect of the invention, said process comprising the steps of mixing said bitumen, said one or more plasticity modifying agent(s), said digestate additive, and said optionally one or more further component(s). Said mixing may be conducted, at least in part, at a temperature between 140 and 220, 160-200, or 170-180° C.

In an eighth aspect, the present invention relates to a bitumen emulsion comprising a composition according to the first or fourth aspect of the invention.

In a ninth aspect, the present invention relates to a maintenance, repair and/or re-cycling process comprising the use of a composition according to the first, fourth or eighth aspect, and/or maintenance, repair and/or re-cycling a sealing layer, road or pavement according to the third or fifth aspect of the invention.

It is an object of the invention to recycle waste components by use of digestate additive as raw material for manufacturing asphalt compositions for paving mixtures.

The present invention is further described by the following numbered embodiments:

1. A composition comprising bitumen, digestate additive, and optionally one or more further component(s).
2. A composition according to embodiment 1, wherein the bitumen is straight run bitumen, hard bitumen, oxidised bitumen, cut-back bitumen or fluxed bitumen.
3. A composition according to embodiment 1 or 2, said further component(s) being one or more aggregate(s), such as natural, manufactured, recycled aggregates, and optionally filler(s), including any combination thereof.
4. A composition according to embodiment 3, said aggregate being one or more of coarse aggregate, fine aggregate, all-in aggregate, and filler aggregate.
5. A composition according to embodiment 3 or 4, wherein the aggregate or filler comprises igneous, sedimentary, and/or metamorphic rock, such as Granite, Syenite, Granodiorite, Diorite, Gabbro, Dolerite, Diabase, Rhyolite, Trachyte, Andesite, Dacite, Basalt; Sandstone, Gritstone, Conglomerate, Breccia, Arkose, Greywacke, Quartzite (ortho), Shale, Siltstone, Limestone, Chalk, Dolomite, Chert, Flint, and Amphibolites, Gneiss, Granulite, Hornfels, Marble, Quartzite (meta), Serpentinite, Schist, Slate; including any combination thereof.
6. A composition according to any one of the preceding embodiments, said composition being suitable for road construction, sealing work or the like.
7. A composition according to any one of the preceding embodiments, wherein said (i) bitumen; (ii) the bitumen and the plasticity modifying agent (i.e. the polymer-modified bitumen (PMB); (iii) the bitumen comprising digestate additive; the PMB and digestate additive; or said composition has one or more characteristics as specified in EN 12591, EN 13924, EN 14023, IS 73:2006, ASTM D946-09, ASTM D3381-09 and M 226-80, EN 12591:2009a (BSI, 2009a), EN 13924:2006 (BSI, 2006), EN 14023:2010 (BSI, 2010a), EN 13304:2009 (BSI, 2009b), EN 13305:2009 (BSI, 2009c), EN 15322:201 3 (BSI, 2013), EN 14023:2010 (BSI, 2010a), EN 14771:2012 (BSI, 2012a), EN 14770: 2012 (BSI, 2012b), EN 13589:2008 (BSI, 2008), EN 13703:2003 (BSI, 2003), EN 13587:2010 (BSI, 2010b), or EN 13398:2010 (BSI, 2010c).

8. A composition according to any one of the preceding embodiments, wherein said bitumen, PMB, bitumen comprising lignin, the PMB comprising lignin, or said composition is of grade 20/30, 30/45, 35/50, 40/60, 50/70, 70/100, 100/150, 160/220, 250/330, or 330/430.

9. A composition according to any one of the preceding embodiments, wherein said one or more plasticity modifying agent is one or more plastomer, one or more thermoplastic elastomer, one or more rubber, one or more viscosity modifier, and/or one or more reactive polymer, including any combination thereof.

10. A composition according to any one of the preceding embodiments, wherein said plastomers is e.g. one or more of ethylene-vinyl acetate (EVA), ethylene-methyl acrylate (EMA), ethylene-butyl acrylate (EBA), atactic polypropylene (APP), polyethylene (PE), polypropylene (PP), polyvinyl chloride (PVC), and polystyrene (PS).

11. A composition according to any one of the preceding embodiments, wherein said one or more plastomer is selected from one or more of: EVA, EMA, EBA, APP, PE, PP, PVC, and PS, including any combination thereof.

12. A composition according to any one of the preceding embodiments, wherein said thermoplastic elastomers is e.g. one or more of butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (IIR), polyisobutene (FIB), polybutadiene (PBD), polyisoprene (PI).

13. A composition according to any one of the preceding embodiments, wherein said one or more thermoplastic elastomers is selected from one or more of: SBE, SBS; SBR, SIS, EBS, EPDM, IIR, FIB, PBD, and PI, including any combination thereof.

14. A composition according to any one of the preceding embodiments, wherein said rubber is a natural rubber, such as latex, or a synthetic rubber, such as recycled tire rubber or recycled crumb rubber.

15. A composition according to any one of the preceding embodiments, wherein said viscosity modifier is one or more flux oil (aromatics, napthenics, parrafinics), or Fischer-Tropsch waxes, including any combination thereof.

16. A composition according to any one of the preceding embodiments, wherein said reactive polymer is one or more random terpolymer of ethylene, acrylic ester and glycidyl methacrylate, or maleic anhydride-grafted styrene-butadiene-styrene copolymer, including any combination thereof.

17. A composition according to any one of the preceding embodiments, wherein said active component is selected from the group comprising or consisting of one or more dispersing agent(s), surfactant(s), hydrotropic agent(s), emulsifier(s), preserving agent(s), anti-foaming agent (s), viscosity modifier(s), reactive polymer(s) and any combination thereof.

18. A composition according to any one of the preceding embodiments, wherein said one or more further component or active component is present in the range of 0.001% to 5% (w/w).

19. A composition according to any one of the preceding embodiments, wherein the bitumen, the one or more plasticity modifying agent(s), the lignin, and the optional one or more further component and/or active agent are in a state of being intermixed.

20. A composition according to embodiment 19, wherein the state of being intermixed is selected from the group comprising or consisting of being intermixed as a solution; being intermixed as a suspension; being intermixed as an emulsion; being intermixed as a dispersion; being intermixed as a slurry; and any combination thereof.

21. A composition according to any one of embodiments 17 to 20, wherein said one or more dispersing agent is selected from the group comprising or consisting of non-ionic, anionic, cationic and amphoteric dispersing agent(s) and any combination and/or compatible mixture thereof.

22. A composition according to any one of embodiments 17 to 21, wherein said one or more dispersing agent is present in said fluid composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

23. A composition according to any one of embodiments 17 to 22, wherein said one or more surfactant is selected from the group comprising or consisting of anionic, cationic, zwitterionic and non-ionic surfactants, and any combination and/or compatible mixture thereof.

24. A composition according to any one of embodiments 17 to 23, wherein said one or more surfactant is present in said fluid composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

25. A composition according to any one of embodiments 17 to 24, wherein said one or more hydrotropic agent is selected from the group comprising or consisting of: non-ionic, anionic, cationic and amphoteric hydrotropes and any combination and/or compatible mixtures thereof.

26. A composition according to any one of embodiments 17 to 25, wherein said one or more hydrotropic agent is present in said fluid composition in an amount of 10-50,000 ppm or 200-40,000 ppm, such as 300-30,000 ppm, e.g. 400-20,000 ppm, for example 500-15,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

27. A composition according to any one of embodiments 17 to 26, wherein said one or more emulsifier is selected from the group comprising or consisting of sodium phosphate(s), sodium stearoyl lactylate cationic, lecithin, DATEM (diacetyl tartaric acid ester of monoglyceride), and any combination and/or compatible mixture thereof.

28. A composition according to any one of embodiments 26 to 36, wherein said one or more emulsifier is present in said fluid composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

29. A composition according to any one of embodiments 17 to 28, wherein said one or more preserving agent is selected from the group comprising or consisting of one or more carboxylate, benzoate, benzoic acid derivative such as parabene(s), aldehyde(s), thiazine(s), organic acid(s) and the like, and any combination thereof.

30. A composition according to any one of embodiments 17 to 29, wherein said one or more preserving agent is present in said fluid composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

31. A composition according to any one of embodiments 17 to 30, wherein said one or more anti-foaming agent is selected from the group comprising or consisting of active silicone polymer(s), siloxane polymer(s), organo-modified siloxane(s), non-silicone compound(s)/composition(s) comprising polypropylene-based polyether dispersions, fatty acid-type antifoam, non-ionic emulsifier, and any combination thereof.

32. A composition according to any one of embodiments 17 to 31, wherein said one or more anti-foaming agent is present in said fluid composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

33. A composition according to any one of embodiments 17 to 32, wherein said one or more viscosity modifier is selected from the group comprising or consisting of one or more flux oil, such as aromatics, napthenics, parrafinics, or any combination of said aromatics, napthenics, parrafinics, Fischer-Tropsch waxes, and any combination thereof.

34. A composition according to any one of embodiments 17 to 33, wherein said one or more viscosity modifier is present in said fluid composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

35. A composition according to any one of embodiments 17 to 34, wherein said one or more reactive polymer(s) is selected from the group comprising or consisting of one or more of: random terpolymer of ethylene, acrylic ester and glycidyl methacrylate, and maleic anhydride-grafted styrene-butadiene-styrene copolymer, and any combination thereof.

36. A composition according to any one of embodiments 17 to 35, wherein said one or more reactive polymer is present in said fluid composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

37. A composition according to any one of the preceding embodiments, wherein said composition is requiring significantly less anti-foaming agent, such as at least 10, 20, 30, 40, 50, 60, 70, 80, or 90% less anti-foaming agent, or no anti-foaming agent, when compared to a comparable composition without digestate additive.

38. A composition according to any one of the preceding embodiments, wherein said composition is requiring significantly less plasticity modifying agent, such as at least 10, 20, 30, 40, 50, 60, 70, 80, or 90% less anti-foam plasticity modifying agent, when compared to a comparable composition without digestate additive.

39. A composition according to any one of the preceding embodiments, wherein said composition comprises significantly more non-bitumen derived carbon, such as at least 10, 20, 30, 40, 50% or more non-bitumen derived carbon when compared to a comparable composition comprising digestate additive in order to provide comparable characteristics such as one or more quality parameters, such as penetration and softening point.

40. A composition according to any one of the preceding embodiments, wherein said composition shows one or more of: (i) a significant reduction in oxidation, e.g. under mixing and/or exposure of a surface to air and/or oxygen; (ii) a significant increase in UV resistance, and/or (iii) a significant increase longevity, wherein said significant reduction or increase is at least 10, 20, 30, 40 or 50%. when compared to a composition without digestate additive.

41. Use of a composition according to any one of the preceding embodiments in one or more of: sealing work, road work, paving work, providing a surface layer, providing a sealing layer, providing a road and providing a pavement, providing a top layer of a road.

42. A sealing layer comprising a composition according to any one of the preceding embodiments.

43. A sealing layer according to embodiment 42, said sealing layer being comprised in a roof, dam, pool, pond, lake, roof, bridge, tunnel, road, or the like.

44. A sealing layer according to embodiment 42 or 43, said sealing layer comprising 5-15, or 7-10% bitumen, optionally being provided by heating mastic asphalt to a temperature of 210° C. and being spreading in layers to form an impervious barrier of e.g. 20 mm.

45. An asphalt composition comprising a composition according to any one of embodiments 1 to 40.

46. An asphalt according to embodiment 45, said asphalt being mastic asphalt or rolled asphalt.

47. A road and/or pavement comprising a composition according to any one of embodiments 1-40, 45 or 46.

48. A road and/or pavement according to embodiment 47, comprising a surface layer and optionally one or more further layers.

49. A road and/or pavement according to embodiment 47 or 48, wherein said one or more further layer is a binder layer, a base layer, and/or a sub base layer.

50. A road and/or pavement according to any one of embodiments 47-49, wherein said surface layer comprises a composition according to any one of embodiments 1-40, 45 or 46.

51. A road and/or pavement according to any one of embodiments 47 to 50, wherein said one or more further layer comprises a composition according to any one of embodiments 1 to 40, 45 or 46.

52. Construction work comprising the provision and/or use of a composition according to any one of embodiments 1-40, 45 or 46, such as a use according to embodiment 41.

53. Construction work according to embodiment 52, said work being road work and/or sealing work.

54. A process for providing a composition according to any one of embodiments 1 to 40, 45 or 46, comprising the steps of mixing said bitumen, and said optionally one or more further component(s).

55. A process according to embodiment 54, wherein said mixing comprises mixing at a temperature between 140 and 220, 160-200, or 170-180° C.

56. A maintenance, repair and/or re-cycling process comprising the use of a composition according to any one of embodiments 1-40, 45 or 46 and/or a sealing layer, road or pavement according to any one of embodiments 42-44, or 47-51.

EXAMPLES

Example 1—Preparation of Digestate Additives 1.1—Preparation of Renescience® Digestate Additive and Renescience® Digestate Ash Digestate additive for laboratory scale asphalt experiments was prepared from unsorted European municipal solid waste (MSW) treated in a demonstration scale Renescience® process comprising enzymatic treatment from e.g. one or more added enzymes and subsequently subjected to anaerobic digestion as described in WO2014/198274 and WO2013/18778.

Experiments were conducted at the Renescience® demonstration plant at Amager resource center (ARC), Copenhagen, Denmark.

The concept of the ARC Renescience® Waste Refinery was to sort MSW into four products: A biogenic slurry (in the following called bioliquid) suitable for biomethane production or other processes, inerts (glass and sand) for recycling and both a "two dimensional" (2D) and a "three dimensional" (3D) fraction of inorganic materials suitable for Refuse Derived Fuel (RDF) and Solid Recovered Fuel (SRF) production as well as for recycling of metals, plastic and wood.

MSW from urban areas was collected. The MSW was transported to the Renescience® Waste Refinery where it was stored in a waste pit until processing.

The Renescience® technology applied in this example comprised three steps.

The first step was a mild heating (pre-treatment) of the MSW by hot water to temperatures in the range of 40-75° C. for a period of 20-60 minutes. This heating and mixing period opened plastic bags and provided adequate pulping of degradable components preparing a more homogenous organic phase before addition of enzymes. Temperature was adjusted in the heating period to the optimum of isolated enzyme preparations which was used for enzymatic hydrolysis. Hot water was added as clean tap water or as washing water first used in the washing drums and then recirculated to the mild heating step.

The second step was enzymatic hydrolysis and fermentation (liquefaction). The enzymatic liquefaction and fermentation was performed continuously at a residence time of app. 12-18 hours, at the optimal temperature and pH for enzyme performance. By this hydrolysis and fermentation, the biogenic part of the MSW was liquefied into a bioliquid.

Figure 3:
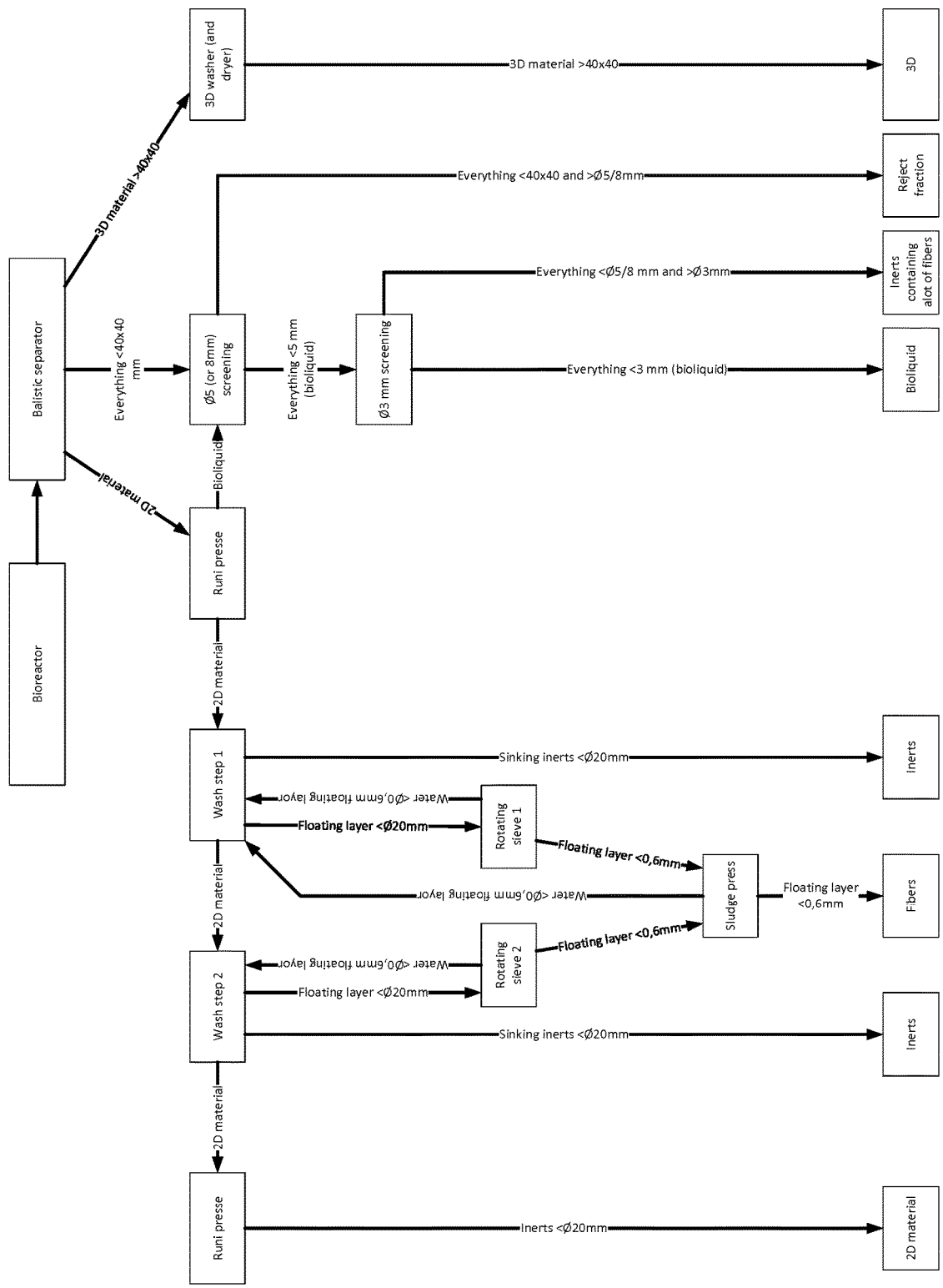
FIG. 3—Example of Renescience® technology

The third step of Renescience® technology as practiced in this example was a separation step where the bioliquid was separated from the non-degradable fractions as outlined in FIG. 3. Separation was as outlined in FIG. 3 performed in a ballistic separator, washing drums and hydraulic presses. The ballistic separator separated the enzymatic treated MSW into the bio-liquid, a fraction of 2D materials, e.g. non-biodegradable, and a fraction of 3D materials, e.g., non-biodegradable. The 3D fraction (physical 3 dimensional objects as cans and plastic bottles) did not bind large amounts of bioliquid, so a single washing step and drying step was sufficient to clean the 3D fraction. The 2D fraction (textiles and foils as examples) bound a significant amount of bioliquid. Therefore, the 2D fraction was pressed using a screw press, washed and pressed again to optimize the recovery of bio-liquid and to obtain a "clean" and dry 2D fraction. During these two washings steps, inerts (which sank) was separated out by two sand washer-like machine and fibers (obtained in the water while washing) was separated by two rotating sieve drums with 0.6 mm holes and pressed dry in a sludge press. The reject water from the rotating drums and the sludge press was recirculated into the two washing machines. Inert material which was sand and glass was sieved from the bioliquid by subjecting it to further "fine" separation using two vibrating sieves, the first having 5 mm sieves, which separated out primarily non-degradable contaminants. The second vibrating sieve, having 3 mm sieves, separated out larger fibres (finer sand and other inerts along with fibers and bio-degradeable material), which comprised a considerable amount of bio-degradable material.

The waste, with added enzymes, was incubated in a reactor termed a "bioreactor" similar to that described in WO2011/032557, featuring a chamber that rotated on a substantially horizontal axis, equipped with attachments on its inner surface that formed a spiral array, which moved MSW continuously back and forth as rotation was performed in both directions. Depending on the degree to which the reactor was filled, the average "residence time" of MSW within the reactor was controlled. The reactor was equipped with heating elements such that an appropriate temperature could be maintained (if sufficient heat was not generated by the process itself). While continuously introducing MSW into the reactor and continuously removing partially degraded MSW from the reactor, a certain average residence time was obtained.

Unsorted MSW was loaded continuously in to the Renescience® demo plant. The isolated enzyme preparation used was a commercially available cellulase preparation optimized for conversion of lignocellulosic biomass and provided by NOVOZYMES™ under the trade name CELLIC CTEC 3™. For periods in which isolated cellulase preparation was used, an amount corresponding to 9 g of enzyme preparation was added for each kg of incoming MSW (0.9% by weight). It is believed that similar results would be obtained using other commercially available enzyme preparations, such as Cellic CTec2™ (Novozymes A/S) and ACCELLERASE 1500™ (Genencor).

Simpler isolated cellulase preparations may also be effectively used to practice methods of the invention.

The settings for the operation were as follows:
Introduced an incoming MSW stream into the enzyme reactor at the rate 280 kg MSW/h.
Adjusted the non-water content of the incoming MSW stream by adding a solution of re-circulated wash water, which had been stored in the buffer tank at approximately 50° C., then heated to approximately 75° C. in the water heater at the rate 560 L water/h.
Introduced CTEC 3™ to the incoming MSW stream at 0.9% by weight.
Run the enzyme reactor so as to achieve an average retention time of approximately 12 hours at approximately 50° C.
2:1 MSW:water
13.5 T reactor filling The produced bioliquid was used for biomethane production in a pilot scale anaerobic digester Shear Enhanced Anaerobic Digestion (SEAD) at the Technical University of Denmark. The pilot-scale CSTR (Continued Stirred Tank Reactor) was a mobile SEAD anaerobic digester provided by VEOLIA/Biothane™. The SEAD anaerobic digester was a 500 Liter tank (Ø0.6×2.1 m) where the biological conversion took place. The main tank was mixed due to the reinjection of the biogas at the bottom of the reactor (230 L/h), and a recirculation pump (2-6 m³/h). The recirculated liquid was reinjected through a nozzle, which applied shear forces and facilitated the disintegration of particulate matter. The effluent was discharged by overflow to a settling tank (0 0.25×0.8 m) where sludge and water were passively separated.

The feedstock was stored in a 100 Liter tank, which was constantly agitated. A 5 mm mesh prevented the introduction of too large particles into the feed tank.

The raw digestate from anaerobic digestion periods with stable biogas production was collected in 100 L drums and stored in a freezer at −18° C. until needed for further testing. The frozen raw digestate drums from the anaerobic digestion were defrosted by leaving at room temperature for 2 days and subsequently mixed thoroughly. The raw digestate was centrifuged in a laboratory scale centrifuge Thermo Scientific SL40R centrifuge in 750 mL containers at 4700 rpm for 15 minutes for phase separation into a water phase centrate with an approximate dry matter content of 0.5-1.5% by weight and a solid digestate phase with an approximate dry matter content of 22-27% by weight (termed Solid Digestate). The solid digestate was dried at 105° C. until constant mass (termed Dried Digestate). The dried digestate is pre-ground on Retsch pulverisette model SM300 with 8 mm screen size, subsequently ground on Retsch pulverisette model ZM200 with 1 mm screen size to produce the Renescience® digestate additive.

For softening point tests with Renescience® digestate ash, described in the following examples, solid digestate was burned to digestate ash in an oven, increasing the temperature from room temperature to 950° C., holding at 950° C. for 2 hours and cooling to room temperature. Burning of digestate at 950° C. resulted in fragile, porous lumps of redish color. After mixing the ashes, the ash was crushed through a 2 mm sieve to produce Renescience® digestate ash.

1.2—Preparation of Food Waste Digestate Additive

Food waste digestate additive was prepared by anaerobic digestion (AD) of food waste using a state of the art AD system at the Renescience facility in Northwich, UK.
a) The feedstock was pasteurised prior to digestion.
b) The food waste was pre-hydrolysed in an anaerobic hydrolysis tank, with a residence time of 2-5 days at ambient temperature.
c) The pre-hydrolysed food waste had an average pH of 3.8 and a total solid content of 17-20% by weight.
d) The pre-hydrolysed food waste was digested in a stirred mesophilic anaerobic digester at a temperature of 39-41° C., with an average hydraulic residence time of 40 days.
e) The food waste effluent had an average pH of 8.3 and a total solid content of approximately 3-4% by weight.
f) The food waste AD effluent or AD digestate was dewatered at the industrial site using decanter centrifuges to a dry matter content of ca. 22-27% by weight. For the dewatering process a polymer solution of a cationic polyacrylamide flocculant was used.
g) The food waste solid digestate was collected in bucket and stored in a freezer at −18° C. until needed for further testing.
h) The solid food waste digestate was dried at 105° C. until constant mass.
i) The dried food waste digestate was ground on Retsch pulverisette model ZM200 with 1 mm screen size to produce the food waste digestate additive.

1.3—Preparation of Sewage Sludge Digestate Additive
a) The waste water goes through typical waste water treatment including coarse sieving and removal of larger particles, sand and fat removal, primary mechanical sedimentation to produce primary sludge, phosphor and nitrogen removal, secondary mechanical sedimentation to produce secondary sludge.
b) The primary and secondary sludge and the smaller amount of fat are transferred to a mesophilic anaerobic digester (AD) operating at a temperature around 37-38° C. with an average residence time of 18 days.
c) The sewage sludge digestate is dewatered at the waste water treatment plant using decanter centrifuges to a dry matter content of ca. 25% w/w.
d) The solid sewage sludge digestate was collected and stored in a freezer at −18° C. until needed for further testing.
e) The solid sewage sludge digestate was dried at 105° C. until constant mass. The dried sewage sludge digestate was pre-ground on Retsch pulverisette model SM300 with 8 mm screen size, subsequently ground on Retsch pulverisette model ZM200 with 1 mm screen size to produce the sewage sludge digestate additive.

Example 2—Composition Analysis and Particle Size Distribution of Renescience® Digestate Additive, Food Waste Digestate Additive, and Sewage Sludge Digestate Additive The prepared digestate additives were sent for composition analysis at an external accredited laboratory, see Table 1.

TABLE 1

Compositional analysis of Renescience ® digestate additive, food waste digestate additive, and sewage sludge digestate additive. All units are on dry mass basis, except for the moisture content being on as received basis.

| Parameter | Unit | Analysis method | Renescience ® digestate additive | Sewage sludge digestate additive | Food waste digestate additive |
|---|---|---|---|---|---|
| Moisture | % by weight | DS/EN ISO 18134 (2015) | 1.2 | 1.5 | 9.3 |
| Ash content | % by weight | DS/EN ISO 18122 (2015) | 45.1 | 36.0 | 40.0 |
| Volatile matter | % by weight | DS/EN ISO 18123 (2015) | 49.7 | 57.6 | 55.3 |
| Fixed carbon | % by weight | ISO 16559 (2014) | 5.2 | 6.2 | 4.3 |
| Cellulose | % by weight | According to Sluiter et al 2008 (NREL/TP-510-42618) | 8.7 | 3.8 | 4.8 |
| Xylan | % by weight | According to Sluiter et al 2008 (NREL/TP-510-42618) | 5.0 | 3.8 | 3.0 |
| C | % by weight | DS/EN ISO 16948 (2015) | 27.5 | 34.2 | 30.5 |
| H | % by weight | DS/EN ISO 16948 (2015) | 3.5 | 4.7 | 4.0 |
| N | % by weight | DS/EN ISO 16948 (2015) | 2.3 | 5.3 | 2.7 |
| N (NH3/NH4) | mg/kg | Photometry | 540 | 5900 | 500 |
| O | % by weight | Calculated by difference. | 21.3 | 19.6 | 22.2 |
| Cl | % by weight | DS/EN ISO 16994 A (2016) | 0.26 | 0.16 | 0.67 |
| F | % by weight | DS/EN ISO 16994 A (2016) | 0.017 | 0.022 | <0.002 |
| Al | % by weight | Acid destruction, ICP-OES radial | 2.6 | 1.2 | 1.1 |
| Ca | % by weight | Acid destruction, ICP-OES radial | 10 | 3.7 | 13 |
| Fe | % by weight | Acid destruction, ICP-OES radial | 1.8 | 3.9 | 2.9 |
| K | % by weight | Acid destruction, ICP-OES radial | 0.78 | 0.59 | 1 |
| Mg | % by weight | Acid destruction, ICP-OES radial | 0.92 | 0.98 | 0.25 |
| Na | % by weight | Acid destruction, ICP-OES radial | 0.59 | 0.33 | 1 |
| P | % by weight | Acid destruction, ICP-OES radial | 0.69 | 3.5 | 2 |
| S | % by weight | Acid destruction, ICP-OES radial | 0.85 | 1.2 | 2.6 |
| Si | % by weight | Acid destruction, ICP-OES radial | 7.2 | 4.7 | 1.4 |
| Ti | % by weight | Acid destruction, ICP-OES radial | 0.2 | 0.18 | 0.069 |

Example 3—Preparation of Asphalt Mixture Composition

Asphalt compositions according to the present invention were prepared according to EN 12697-35:2016.

3.1—Providing of Aggregates and Filler

Aggregates and filler, when not already dry, were dried at 110±15° C., preferably at 110±5° C., most preferably 110° C., to obtain constant mass.

Dry aggregates, e.g. granite and filler, e.g. limestone, Francis Flower, were then mixed to meet the requirements of AC20 Dense Bin 40/60 according to EN 13108-1:2016.

Particle size distribution of the mixture was measured according to EN 933-1:2012 and is shown in Table 3.

TABLE 3

Particle size distribution of the aggregate mixture

| Sieve size (mm) | Percentage passing sieve (% w/w) |
| --- | --- |
| 31.5 | 100 ± 0% |
| 20 | 95 ± 1% |
| 14 | 78 ± 6% |
| 10 | 61 ± 7% |
| 8 | 57 ± 7% |
| 6.3 | 53 ± 6% |
| 4 | 45 ± 4% |
| 2 | 34 ± 3% |
| 1 | 27 ± 2% |
| 0.5 | 21 ± 1% |
| 0.25 | 17 ± 1% |
| 0.125 | 13 ± 0% |
| 0.063 | 10 ± 0% |

3.2—Providing of Binder

Bitumen Penetration Grade 40/60 was used as binder in one of the assays performed to obtain as asphalt mixture composition comprising digestate additive.

Bitumen was poured into metal containers until nearly full and the containers were covered with lids. The bitumen was heated to 155±25° C., preferably 155±5° C., most preferably 155° C., by having said containers in ventilated heating chambers set at 155±25° C., preferably 155±5° C., most preferably 155° C., for a duration of between 1 and 12 hours (h), preferably between 4 h and 8 h.

After heating, bitumen was stirred before being mixed with other components, to obtain the asphalt mixture composition.

3.3—Mixing the Aggregate(s), Filler(s) and Binder(s) with Digestate Additive to Obtain an Asphalt Mixture Composition Before the mixing begins, mixing containers were preheated to 155±25° C., preferably 155±5° C., most preferably 155° C.

Then aggregates preheated to 155±25° C., preferably 155±5° C., most preferably 155° C., were weighed into the containers. Aggregates were mixed together.

For samples comprising digestate additive, this was added to the mixtures until reaching the desired concentration of about 0.5%, 1%, 5%, 10%, 15%, 20%, 25%, 30%, 35%, 40%, 45%, 50%, 55%, 60%, 65% or 70% of digestate by weight of said asphalt mixture composition.

Bitumen used in this assay was then added until reaching the desired binder content in the asphalt mixture composition.

All components were then thoroughly and continuously mixed in said containers, until an intimate mixture was obtained, with the aggregate(s) being entirely coated with the binder(s), in particular bitumen, with or without digestate additive replacing bitumen to obtain about 0.5%, 1%, 5%, 10%, 15%, 20%, 25%, 30%, 35%, 40%, 45%, 50%, 55%, 60%, 65% or 70% by weight of said asphalt mixture composition.

3.4—Compacting the Asphalt Mixture Composition

Compaction may be performed according to more than one method, depending on the features of the obtained asphalt mixture composition and also depending on the measurements we wish to perform.

For the purpose of measuring wheel rutting of an asphalt mixture composition, as in Example 4.1, compaction was made by roller compaction according to EN 12697-33, using a roller running on vertical sliding steel plates to produce specimens of 200 mm in diameter.

For the purpose of measuring water sensitivity of an asphalt mixture composition, as in Example 4.2, compaction was made according to EN 12697-30:2012 with 50 blows on each side.

For the purpose of measuring indirect tension to determine stiffness modulus of an asphalt mixture composition, as in Example 4.3, compaction was gyratory compaction according to EN 12697-31:2007.

Example 4—Analysing the Asphalt Mixture Compositions 4.1—Wheel Rutting

Wheel tracking was performed according to Procedure B (small size device) in EN 12697-22, using a Cooper Auto Lift Arm ECO Wheel Tracker to determine the wheel rutting in asphalt mixture composition samples.

The wheel tracking machine was set in motion and readings were taken at the vertical displacement of the wheel, initially, then at least 6 or 7 times in the first hour, and at least one reading every 500 load cycles thereafter.

The vertical position of the wheel was defined as the mean value of the profile of the specimen on a length of ±50 mm about the centre of the loading area at the mid point of traverse, measured in at least 25 points approximately equally spaced. The vertical position of the wheel was measured without bringing it to a stop.

Tracking continued until 10 000 load cycles were applied, or until a rut depth of 20 mm was reached, whichever was the shorter.

Results were expressed as proportional rut depth (% of sample thickness), which was calculated by dividing the rut depth (expressed in mm) with the initial sample thickness (expressed in mm) measured according to EN 12697-29:2002 and expressing the result in percentage.

Rut depth is the measure of the depth of the rut a wheel makes in the asphalt after running back and forth a set number of times. This is an indication of the durability of asphalt when used for paving.

Wheel Rutting of Asphalt Comprising Different Types of Digestate

Rut depth was determined for asphalt mixture compositions comprising different types of digestate (Table 4). Rut depth is the measure of the depth of the rut a wheel makes in the asphalt after a set number of repeated passes. This is an indication of the durability of asphalt when used for paving. It was observed that the wheel rutting of asphalt was reduced when replacing about 11% (w/w) of bitumen in asphalt mixture compositions, with Renescience® digestate additive, when compared to the control with bitumen not replaced with digestate additive in a standard asphalt product (AC20 Dense Bin 40/60).

TABLE 4

Rut depth of asphalt mixture composition where different types of digestate additive replaced 11% (w/w) of the original 4.6% (w/w) bitumen in AC20 Dense Bin 40/60

| | Amount of bitumen replaced with digestate (% w/w) | Rut depth (% specimen thickness) |
|---|---|---|
| Control (AC20 Dense Bin 40/60) | 0 | 5.6 ± 1.5 |
| Digestate (Renescience ®) | 11 | 3.5 ± 0.6 |
| Digestate (Sewage sludge) | 11 | 3.9 ± 0.2 |
| Digestate (Food waste) | 11 | 7.7 ± 1.8 |

In conclusion, the quality of asphalt mixture compositions was improved when replacing bitumen with Renescience digestate additive. Replacing bitumen with sewage sludge digestate had a similar effect, while Food waste digestate had the opposite effect, causing higher rut depth, hence a reduced quality of the resulting asphalt mixture composition comprising food waste digestate additive.

Wheel Rutting of Asphalt Comprising Renescience® Digestate at Different Concentrations Rut depth was determined for asphalt comprising different contents of Renescience® digestate (Table 5).

TABLE 5

Rut depth of asphalt mixture composition where Renescience ® digestate additive replaced different amounts of bitumen of the original 4.6% bitumen in AC20 Dense Bin 40/60

| Amount of bitumen replaced with Renescience ® digestate (%) | Rut depth (% specimen thickness) |
|---|---|
| 0% | 5.6 ± 1.5 |
| 11% | 3.5 ± 0.6 |
| 22% | 4.1 ± 0.8 |

In conclusion, with about 11% (w/w) bitumen replacement with Renescience® digestate, rut depth of the asphalt mixture composition was significantly reduced, hence improving the durability of said asphalt mixture composition. Furthermore, with about 22% (w/w) bitumen replacement with Renescience® digestate, an improvement from 5.6% to 4.1% (of specimen thickness) rut depth was achieved, which is also a significant improvement of the asphalt mixture composition performance and durability.

4.2—Determining Water Sensitivity

Asphalt mixture compositions prepared according to Example 3 was compacted by impact compaction according to EN 12697-30:2012 with 50 blows on each side.

For each asphalt composition, 10 specimens were produced, each with a diameter of approximately 100±3 mm.

Dimensions of the specimens were measured according to EN 12697-29:2002 and bulk density was measured according to EN 12697-6:2012.

According to EN 12697-12:2008, water sensitivity was determined by first diving said specimens into two subsets, having approximately the same average length and average bulk density.

The difference of the average lengths did not exceed 5 mm, and the difference of the average bulk densities did not exceed 15 kg/m$^3$.

The test specimens (both subsets) had the same age (prepared within one week), allowing for 16 h to 24 h for curing before the start of the conditioning procedure.

Conditioning

The dry subset of specimens (5 specimens) were stored on a flat surface at room temperature in the laboratory, within 20±5° C.

The wet subset of specimens (5 specimens) were placed on the perforated shelf in the vacuum container filled with distilled water at 20±5° C. to a level at least 20 mm above the upper surface of the test specimens.

A vacuum was applied to obtain an absolute (residual) pressure of 6.7±0.3 kPa within 10±1 min.

The pressure was decreased slowly to avoid expansion damage of the specimens.

Vacuum was maintained for about 30±5 min.

Then the atmospheric pressure was slowly let into the vacuum container.

The specimens were left submerged in water for another 30±5 min.

The volume of the specimens was calculated in accordance with EN 12697-6. Any specimen which has increased by more than 2% in volume was rejected.

The wet subset of specimens was then placed in a water bath at 40±1° C. for a period of approximately 68 h to 72 h.

Indirect Tensile Strength

Specimens were brought to the specified test temperature of 25±2° C. in an air chamber. Indirect tensile strength of specimens was determined within 1 min from leaving the air chamber.

According to EN 12697-23:2017, a conditioned specimen was placed in the testing head for measuring peak load of the specimen.

The testing machine was placed in a room with temperature between 15° C. and 25° C.

The specimen was aligned on the lower loading strip, so that the specimen could be loaded diametrically.

Compression of the specimen was performed by applying a diametrical load continuously and without shock at a constant speed of deformation of 50±2 mm/min after a transitory period less than 20% of the loading time, until the peak load was reached.

Peak load was recorded and indirect tensile strength (ITS) was calculated according to the following formula:

$$ITS = 2P/\pi DH * 1000$$

where P is the peak load, D is the diameter, H is the height, and ITS is the indirect tensile strength expressed in kPa.

Water sensitivity was reported as the ratio between mean ITS for the wet specimens and the dry specimens and is expressed in percentage.

Water Sensitivity of Asphalt Comprising Different Types of Digestate

Water sensitivity was determined for asphalt mixture compositions comprising different types of digestate additive (Table 1).

Water sensitivity is a measure for the susceptibility of asphalt towards water damage. It is measured by determining the ratio between the indirect tensile strengths of a water conditioned subset of samples with the indirect tensile strength of a dry subset. If the ratio between these indirect tensile strengths are low, it indicates that the asphalt is more susceptible to water damage compared to asphalt with a high ratio for water sensitivity.

TABLE 1

Water sensitivity of asphalt mixture composition where different types of digestate additive replaced 11% (w/w) of the original 4.6% (w/w) bitumen in AC20 Dense Bin 40/60

| | Amount of bitumen replaced with digestate (% w/w) | Indirect tensile strenth (Dry, kPa) | Indirect tensile strenth (Wet, kPa) | Water sensitivity (Wet/Dry) |
|---|---|---|---|---|
| Control (AC20 Dense Bin 40/60) | 0% | 1.544 | 0.885 | 57% |
| Digestate (Renescience ®) | 11% | 1.473 | 0.816 | 55% |
| Digestate (Sewage sludge) | 11% | 1.882 | 1.113 | 59% |
| Digestate (Food waste) | 11% | 1.66 | 1.079 | 65% |

It was shown that about 11% (w/w) of bitumen could be replaced with Renescience® and sewage sludge digestates, respectively, in asphalt mixture composition, without any significant change in water sensitivity. By replacing about 11% (w/w) bitumen with food waste digestate, the water sensitivity of asphalt was slightly increased.

4.3—Determining Stiffness Modulus by Indirect Tension to Cylindrical Specimens (IT-CY)

Preparation of Specimens

Asphalt mixture compositions prepared according to the Example 3 were compacted by gyratory compaction according to EN 12697-31:2007. Stiffness modulus was determined according to EN 12697-26:2004 (E) Annex C.

Obtained specimens were about 150±5 mm in diameter. Using a saw, the compacted specimens were trimmed to form a nominal right cylinder. Any projecting aggregate particles were removed by trimming the core surface flush. The specimens were clamped in the jig and sawn to a thickness of about 60±5 mm.

Dimensions of the specimens were measured according to EN 12697-29:2002.

Bulk densities were measured according to EN 12697-6: 2003+A1:2007(E), Procedure B. The bulk density of each specimen used for further analyses did not deviate more than 1 from the average apparent density of the batch. All specimens that did deviate were rejected.

Measurement of Stiffness Modulus

Prior to testing, all specimens were conditioned at 20±0.4° C. for 24 hours. A specimen was mounted in the Cooper Servo-Pneumatic Universal Testing Machine. For conditioning, at least 10 conditioning pulses was applied in order to enable the equipment to adjust the load magnitude and duration to give the specified horizontal diametral deformation and time. Target deformation was 7±2 μm, rise time 124±4 ms, and Poisson's Ratio used was 0.35.

The crosshead was positioned to give a target load area factor close to 0.60. If the load area factor was not 0.60±0.10, results were rejected.

Following EN 12697-26:2004 (E) Annex C, stiffness modulus was calculated according to the following equation:

$$E = F * \frac{v + 0.27}{z * h},$$

where E is the stiffness modulus (expressed in MPa), F is the peak value of the applied vertical load (expressed in N), z is the amplitude of horizontal deformation obtained during the load cycle (expressed in mm), h is the mean thickness of the specimen (expressed in mm), v is the Poisson's ratio (in this case assumed to be 0.35).

After determination of stiffness modulus of a specimen, it was rotated 90±10° and the measurements were repeated to obtain a replicate for the stiffness modulus of the specimen. For each asphalt composition, stiffness modulus was expressed as mean values for 6 specimens (each in two positions in total yielding 12 replicates per asphalt composition).

Stiffness Modulus of Asphalt Comprising Different Types of Digestate

The stiffness modulus was determined for asphalt mixture compositions comprising different types of digestate (Table 7). Stiffness modulus was used as a guide to relative performance in the pavement, to obtain data for estimating the structural behavior in the road and to judge test data according to specifications for asphalt. Asphalt where 11% (w/w) of the bitumen was replaced with Renescience® digestate showed similar stiffness modulus compared to the control.

TABLE 7

Stiffness modulus for asphalt mixture compositions where different types of digestate additive replaced 11% (w/w) of the original 4.6% (w/w) bitumen in AC20 Dense Bin 40/60

| | Amount of bitumen replaced with digestate (% w/w) | Stiffness modulus (MPa) |
|---|---|---|
| Control (AC20 Dense Bin 40/60) | 0% | 3200 ± 700 |
| Digestate (Renescience ®) | 11% | 3600 ± 300 |
| Digestate (Sewage sludge) | 11% | 5700 ± 400 |
| Digestate (Food waste) | 11% | 5200 ± 500 |

This result showed that the stiffness modulus could be retained when using Renescience® digestate as an additive. In contrast, asphalt comprising sewage sludge digestate and food waste digestate showed increased stiffness modulus. Results indicated that these types of digestate could be used to modify the stiffness modulus.

Stiffness Modulus of Asphalt Mixture Composition Comprising Renescience® Digestate at Different Concentrations The stiffness modulus was determined for asphalt mixture compositions comprising Renescience® digestate (Table 8). Stiffness modulus was used as a guide to relative performance in the pavement, to obtain data for estimating the structural behavior in the road and to judge test data according to specifications for asphalt.

TABLE 8

Stiffness modulus of asphalt where Renescience ® digestate additive replaced different amounts of bitumen of the original 4.6% (w/w) bitumen in AC20 Dense Bin 40/60

| Amount of bitumen replaced with Renescience ® digestate (% w/w) | Stiffness Modulus (MPa) |
|---|---|
| 0% | 3200 ± 700 |
| 11% | 3600 ± 300 |
| 22% | 10900 ± 900 |

Results showed, that when replacing about 11% (w/w) of bitumen with Renescience® digestate, stiffness modulus of asphalt was retained, which means that Renescience® digestate can be used as an additive at 11% replacement of bitumen for modifying other properties of asphalt while retaining the stiffness modulus.

When replacing approximately 22% (w/w) of bitumen with Renescience® digestate, stiffness modulus increased to 10900 MPa.

Compared to the control (AC20 Dense Bin 40/60), this was a 3.4 factor increase, meaning that Renescience® digestate can be used to increase the stiffness modulus of asphalt at 22% (w/w) substitution of bitumen (1% (w/w) of the asphalt mixture composition).

Example 5—Binder Properties after Recovery by Rotary Evaporator

By following the procedure described in EN 12697-3: 2013, binder was recovered from asphalt mixture compositions prepared according to Example 3.

Dichloromethane was used as solvent and conditions for first distillation phase were about 85±5° C. and 85±5 kPa, while conditions for a second distillation phase were 150±5° C. and 2.0±0.2 kPa.

Instead of nitrogen as an inert gas, atmospheric air was used as atmosphere in the evaporating flask. On the extracted binder, softening point was determined according to EN 1427:2007 and penetration was determined according to EN 1426:2015.

Binder Properties after Recovery by Rotary Evaporator from Asphalt Mixture Compositions Comprising Different Types of Digestate The binder properties (specifically penetration and softening point) were determined for bitumen extracted from asphalt mixture compositions comprising different types of digestate (Table 9).

The softening point and penetration of the recovered binder is an indication of the binder properties in the asphalt. In different asphalt applications, different softening points and penetrations are required, so any change (higher or lower values) could potentially be an advantage. For example, roads in geographic locations with cold climates, bitumens with lower softening points are preferred to avoid cracking, while roads in warm climates need bitumens with higher softening points.

TABLE 9

Binder properties after recovery of bitumen from asphalt mixture compositions where different types of digestate replaced 11% (w/w) of the original 4.6% (w/w) bitumen in AC20 Dense Bin 40/60

| | Amount of bitumen replaced with digestate (% w/w) | Softening Point (° C.) | Penetration (dmm) |
|---|---|---|---|
| Control (AC20 Dense Bin 40/60) | 0% | 58.2 | 34 |
| Digestate (Renescience ®) | 11% | 53.4 | 52 |
| Digestate (Sewage sludge) | 11% | 53.4 | 36 |
| Digestate (Food waste) | 11% | 67.6 | 17 |

As expected, the penetration of the binder in the control sample decreased compared to the penetration of the original binder (pen 40/60), indicating hardening of the binder during asphalt mixing.

In contrast, penetration of binder recovered from asphalt comprising Renescience® digestate additive was within the range of the original binder used. This shows that Renescience® digestate additive has an anti-aging effect on the binder.

Softening point of the binder was also lower for asphalt mixture compositions comprising Renescience® digestate additive compared to the control, indicating that the properties of the binder were affected.

Sewage sludge digestate also affected the binder's properties by causing a decrease in softening point of the recovered binder compared to the control, but the penetration was retained compared to the control.

Food waste digestate also affected the properties of the recovered binder, but in contrast to the other types of digestate it caused an increase in softening point and decrease in penetration compared to the control.

Example 6—Preparation of Polymer Modified Bitumen (PmB)

For showing that digestate can be used to modify the properties of polymer modified bitumen directly (i.e. before mixing with aggregates in asphalt mixture compositions), a series of experiments were conducted with polymer modified bitumen.

Softening point was measured to show that the properties of polymer modified bitumen were modified.

Polymer modified bitumen was prepared by initially heating bitumen (330/430) to 180° C. using a glycerol bath.

SBS (Polystyrene-block-polybutadiene-block-polystyrene, styrene 30% (w/w); CAS no: 9003-55-8; Sigma-Aldrich) was added to the bitumen to reach a final concentration of 5.4% (w/w) in the Polymer modified bitumen.

Bitumen with SBS was left for 15 min until the SBS was heated up. Homogenisation was performed by gradually increasing stirring rate (5000 rpm for 10 min, 10000 rpm for 20 min, 15000 rpm for 20 min) using an IKA T25 Ultra Turrax (S25N-18G Dispersing element). Homogenised bitumen was aliquoted into 20 mL glass scintillation vials (10 g in each).

6.1—Modification of Polymer Modified Bitumen (PmB) Modification of PmB with Different Types of Digestate Polymer modified bitumen (PmB) was prepared according to Example 6. PmB was further modified using digestate or lignin as additives to the desired final concentration. Lignin was obtained from the Inbicon process as described in Larsen, J. et al 2012. Biomass and Bioenergy, 46, 36-45.

Modification was done by adding the additive and homogenizing using an Ultra Turrax (S25N-10G Dispersing element; 10000 rpm with dispersing element as close to the vial bottom as possible) for 10 min. No additive was added to the negative control. Afterwards, softening point of the modified PmB was measured according to EN 1427:2015. A change in softening point showed that the properties of the PmB were modified.

Highest increase in softening point was achieved with Renescience® digestate (20% (w/w) content) compared to the other types of digestate, overall a 20% increase in softening point was achieved with Renescience® digestate (Table 10). This effect did not come solely from the inorganic part of Renescience digestate additive, since adding 8% (w/w) Renescience digestate ash (which is the isolated inorganic fraction of Renescience digestate additive) to the binder did not cause such increase in softening point (Table 11). It could therefore be concluded, that some or the whole effect on the binder from mixing with Renescience digestate additive was due to its organic fraction.

Food waste digestate, lignin, and Renescience® digestate ash also caused an increase in softening point (Table 10) for the modified PmB (20% (w/w) content), but not to the same extent as Renescience® digestate.

Sewage sludge digestate caused extensive foaming during mixing and the bitumen was too viscous for the softening point measurement. The foaming by mixing of binder with food waste digestate also indicated that practical handling of food waste digestate in industrial scale could become an issue.

In Table 11, it is shown that Renescience digestate ash also slightly increased the softening point of the binder when added at 20% (w/w). Generally, when added to binder or asphalt one might expect similar properties as commercially available fillers such as limestone filler from Francis Flower.

TABLE 10

Softening point for binder comprising PmB and digestate.

| | Digestate content (% w/w of final binder) | Softening point (° C.) |
|---|---|---|
| Control (PmB with 5.4% (w/w) SBS) | 0% | 56.3 ± 3.9 |
| Digestate (Renescience ®) | 20% | 67.6 ± 0.3 |
| Digestate (Sewage sludge) | 20% | 63.8 ± 3.2 |
| Digestate (Food waste) | 20% | N.m. |
| Lignin (Inbicon) | 20% | 64.2 ± 1.2 |
| Renescience ® digestate ash additive | 20% | 62.3 ± 0.1 |

N.m = not measurable due to extensive foaming and high viscosity

TABLE 11

Modification of PmB with Renescience ® digestate and other types of additives

| | Additive content (% w/w of final binder) | Softening point (° C.) |
|---|---|---|
| Control (PmB with 5.4% SBS) | 0% | 56.3 ± 3.9 |
| Renescience ® digestate additive | 20% | 67.6 ± 0.3 |
| (Inorganic fraction) Renescience ® digestate ash additive | 8% | 53.4 ± 1.1 |

6.3—Modification of Different Types of Polymer Modified Bitumen (PmB) with Renescience® Digestate Modification of three different types of bitumen with Renescience® digestate was performed to show that Renescience® digestate additive can be used to modify a variety of bitumen types. Bitumen (330/430) was modified with 5.4% (w/w) SBS according to Example 6. In addition, bitumen (40/60) and Polymer modified bitumen (25/55-55) were tested. All bitumen types were modified with digestate additive according to Example 3 and softening point was measured according to EN 1427:2015. Softening point without any addition of digestate additive was compared to that of bitumen modified with 20% (w/w) Renescience® digestate additive in Table 12.

TABLE 12

Softening point for different types of binder with and without 20% (w/w) Renescience ® digestate additive

| | Softening point without digestate (° C.) | Softening point with 20% (w/w) Renescience ® digestate (° C.) |
|---|---|---|
| Bitumen (330/430) modified with 5.4% SBS | 60.8 | 67.6 ± 0.3 |
| Bitumen (40/60) | 52.3 ± 0.1 | 55.1 ± 0.1 |
| Polymer modified bitumen (25/55-55) | 61 ± 0.5 | 66.3 ± 0.4 |

Results clearly showed that the softening point of bitumen increased independently of bitumen type when modifying with about 20% (w/w) Renescience® digestate additive.

Example 7—Bitumen Ageing Characterization and Analysis

Example 7.1—Preparation of Bitumen Samples for Aging

Renescience® Digestate Additive was prepared according to Example 1 and mixed into bitumen (characterised by having a penetration value of 49 dmm according to EN 1426:2015 and softening point 50.2° C. according to EN 1427:2007) using high shear mixing for 10 min at 165° C.

Sub-samples were taken for dynamic shear rheometry (DSR) by pouring into 8 mm and 25 mm silicon moulds, respectively. DSR was subsequently used to characterize the viscous and elastic behaviour of bitumen and calculate the fatigue cracking parameters and rutting resistance parameters for bitumen with and without Renescience digestate additive (Example 10 and 11).

All samples were then left to cool and were stored for further testing.

Example 7.2—Storage Stability of Bitumen Comprising Renescience® Digestate Additive Storage stability of bitumen comprising Renescience® Digestate Additive was tested according to EN 13399:2017.

On a tube compliant with EN 13399:2017, a marking line was drawn for the maximum filling height (100 mm to 120 mm). Then the tube was marked to make three equal parts from the maximum filling height.

The homogeneous liquid sample was carefully poured into the tube to the filling mark to avoid incorporation of air bubbles. The tube jacket was squeezed slightly flat after filling to allow thermal expansion. The open end of the tube was pressed at a short distance above the binder surface. It was ensured that no air remained by squeezing the test material up along the interior part of the tube. The tube end was pressed flat and the tube end was folded tightly at least two times using forceps.

Within 1 h after filling, the tube was placed in the preheated oven in a vertical position. The tube was maintained in a vertical position at 180±5° C. for 72±1 h.

The tube was then removed from the oven and let to cool down to room temperature at the same vertical position.

Sample was recovered by placing the cooled tube horizontally on a hard, flat and clean surface, and cut into three equal parts with a sharp, heated cutting tool.

The middle part was discarded. The top and bottom parts were placed separately in respective tins marked "top" and "bottom".

Bitumen was heated to 180° C. and left in the oven for no longer than 60 min. Then, aluminum pieces from the cutting procedure were removed and samples were homogenized before preparing samples for softening point test compliant with EN 1427:2015.

Storage stability was quantified by measuring the ratio in softening point measured according to EN 1427:2015 between "top" and "bottom".

According to Table 13, bitumen comprising Renescience® Digestate Additive is storage stabile at contents up to 10% (w/w). When mixing Renescience® Digestate Additive into bitumen at a content of 15% (w/w), the additive precipitated yielding a significantly higher softening point of the bottom part of the sample compared to the top part.

TABLE 13

Storage stability of bitumen with different contents of Renescience ® Digestate Additive measured according to EN 13399:2017

| Content of Renescience ® Digestate Additive in bitumen (% w/w) | Softening Point (° C.) Top | Softening Point (° C.) Bottom | Difference (° C.) |
|---|---|---|---|
| 5% | 50.8 | 50.6 | 0.2 |
| 10% | 51.0 | 51.0 | 0.0 |
| 15% | 51.4 | >80.0 | >30.0 |

Example 8—Rolling Thin Film Oven (RTFO) Aging of Bitumen Comprising Digestate

Rolling thin film oven aging was conducted on bitumen either with or without digestate according to EN 12607-1:2014 to assess the combined effects of heat and air on bitumen thereby simulating the hardening which most bituminous binders undergo during mixing in an asphalt mixing plant.

The Infratest RTFO oven complaint with EN 12607-1:2014 was leveled, and the oven was pre-heated to the test temperature of 163±1° C.

35.0±0.5 g of the bitumen sample was weighted into the required amount of glass containers. 16 glass containers were filled with each bitumen sample.

Samples were mounted into the pre-heated RTFO oven. The samples were rotated at a rate of 15.0±0.2 r/min, and the airflow was set to a rate of 4.0±0.2 l/min. The samples were maintained in the oven with the air flowing for 75±1 min from the time the temperature reached 1° C. below the test temperature.

At the end of the test period, the containers were removed from the oven and replicate samples were mixed to a single sample according to EN 14769:2012. Sub-samples were taken for DSR testing by pouring into 8 mm and 25 mm silicon moulds, respectively. All samples were then left to cool and stored for further testing.

Example 9—Pressure Aging Vessel (PAV) Aging of Bitumen Comprising Digestate

Sub-sample subjected to RTFO aging according to Example 8 were subjected to further aging by Pressure Aging Vessel (PAV) aging according to EN 14769:2012 to simulate in-service aging occurring to the binder within the asphalt road over a 7 to 10 year period.

As preparation for the tests, the containers, pan holder and pressure vessel (Prentex, model no. 9300) compliant with EN 14769:2012 were pre-heated to the PAV conditioning temperature. 50.0±0.5 g of each bitumen sample was weighted into each pre-heated container. The bitumen samples were distributed over the entire base of the containers by tilting the filled containers if necessary.

The filled containers were placed in the pan holder and the pan holder including samples were placed into the pressure vessel. The pressure vessel was closed and secured. Aging conditions (90° C.±0.5° C. and 2.1±0.1 MPa) were maintained in the pressure vessel for 20 h±10 min.

At the completion of the aging time, the internal pressure was slowly released in the pressure vessel using the air pressure bleed valve to achieve atmospheric pressure within 8-15 min. Sample containers were transferred from the pressure vessel to a pre-heated oven set to 170±5° C. and left for 30±1 min. When fluid, each container was stirred to remove any air bubbles. Containers with identical samples were combined by pouring the hot samples into a suitable, larger, single container and mixed.

If air bubbles were entrapped within the binder, the containers with the binder were transferred into a vacuum oven set at 170±5° C. The containers were allowed to stand in the oven for 10±1 min without the vacuum applied. After 10 min of equilibration, the vacuum valve was opened, and the pressure was rapidly reduced to 15±2.5 kPa and this pressure was maintained for 30±1 min. At the end of the 30 min, the vacuum was released and the container was removed from the oven.

Samples were taken for DSR testing by pouring into 8 mm and 25 mm silicon molds, respectively. All samples were then left to cool and stored until testing.

Example 10—Rutting Resistance Parameter of Short-Term (RTFO) Aged Bitumen with and without Renescience® Digestate Additive Assessed by Dynamic Shear Rheometry (DSR)

Rutting resistance parameters for short-term aged bitumen samples were calculated based on Complex Shear Modulus (G*) and phase angles (δ) measured by DSR using a Malvern Kinexus Pro+ according to EN 14770:2012.

G* and δ was determined for bitumen comprising 0%, 5%, 10%, and 15%, respectively, by weight of Renescience Digestate Additive prepared according to Example 7 and subjected to short-term (RTFO) aging according to Example 8.

In the DSR measurements, frequency was 0.4 Hz, plate diameter was 25 mm, gap setting was 1.0 mm, and temperature was 60° C. Standard deviation of DSR measurements were calculated from the average difference between measurements of G* and δ, respectively, at 45° C. and 50° C. using 8 mm plate and 25 mm plate, respectively.

Rutting resistance parameter indicates the ability of the bitumen to resist permanent deformation by rutting and was calculated by: $G^*/\sin(\delta)$.

Figure 4:
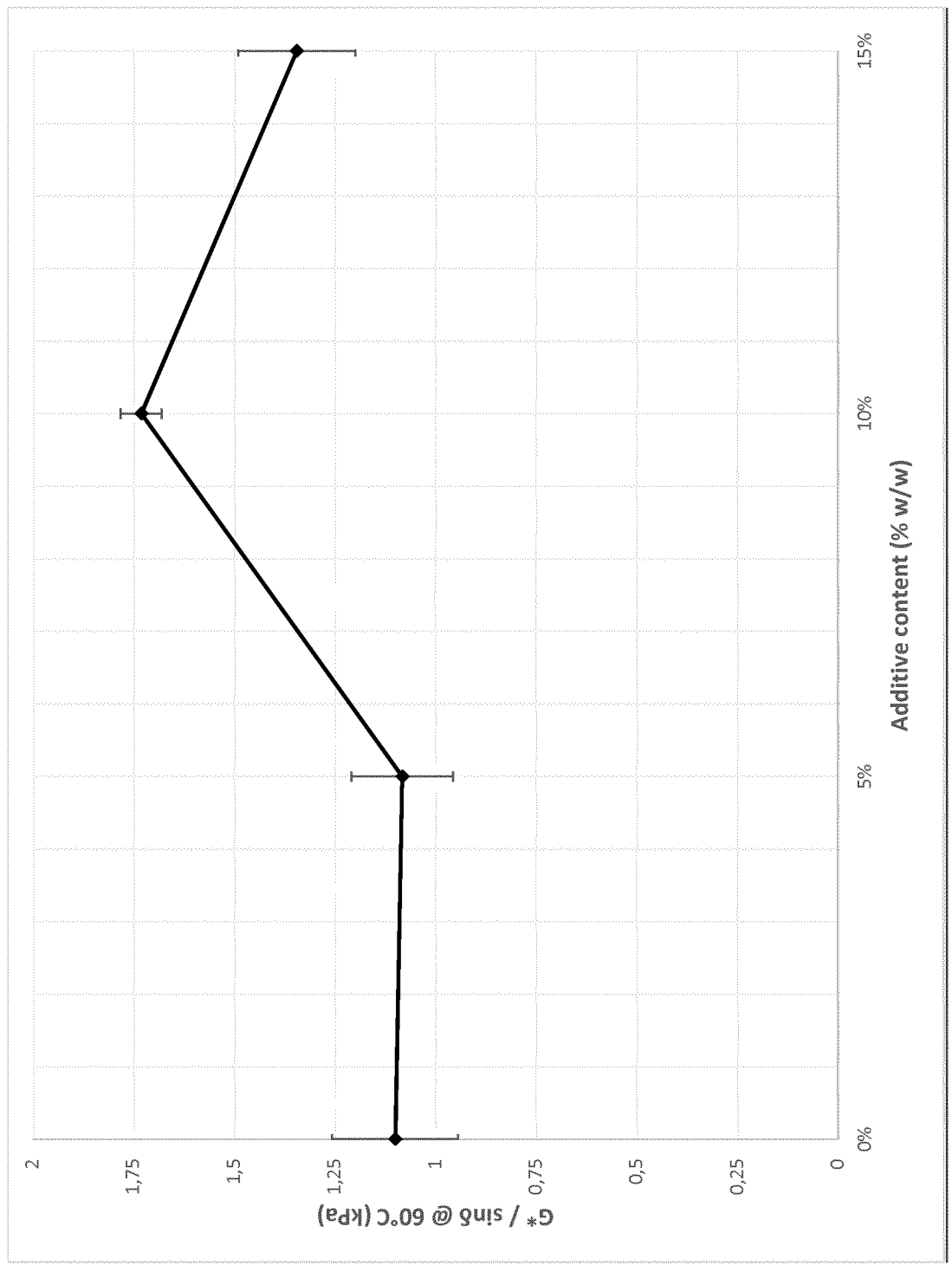
FIG. 4—Rutting resistance parameter for bitumen with and without Renescience® Digestate Additive (from 0% to 15% by weight)

FIG. 4 showed that the rutting resistance parameter of bitumen comprising 10% (w/w) Renescience® Digestate Additive was higher compared to when the additive was absent.

At a content of 15% (w/w) Renescience® Digestate Additive in bitumen, the rutting resistance parameter decreased indicating a potential optimum at 10% (w/w).

Example 11—Fatigue Cracking Parameter of Long-Term (PAV) Aged Bitumen with and without Renescience® Digestate Additive Assessed by Dynamic Shear Rheometry (DSR)

Fatigue cracking parameter for long-term aged bitumen samples were calculated based on Complex Shear Modulus ($G^*$) and phase angles ($\delta$) measured by DSR using a Malvern Kinexus Pro+ according to EN 14770:2012.

$G^*$ and $\delta$ was determined for bitumen comprising 0%, 5%, 10%, and 15%, respectively, by weight of Renescience® Digestate Additive prepared according to Example 7 and subjected to long-term (PAV) aging according to Example 9. In the DSR measurements, frequency was 0.4 Hz, plate diameter was 8 mm, gap setting was 2.0 mm, and temperature was 25° C.

Standard deviation of DSR measurements were calculated from the average difference between measurements of $G^*$ and $\delta$, respectively, at 45° C. and 50° C. using 8 mm plate and 25 mm plate, respectively.

The fatigue cracking parameter indicates the ability of the bitumen to resist fatigue cracking and was calculated by: $G^* \cdot \sin(\delta)$.

Figure 5:
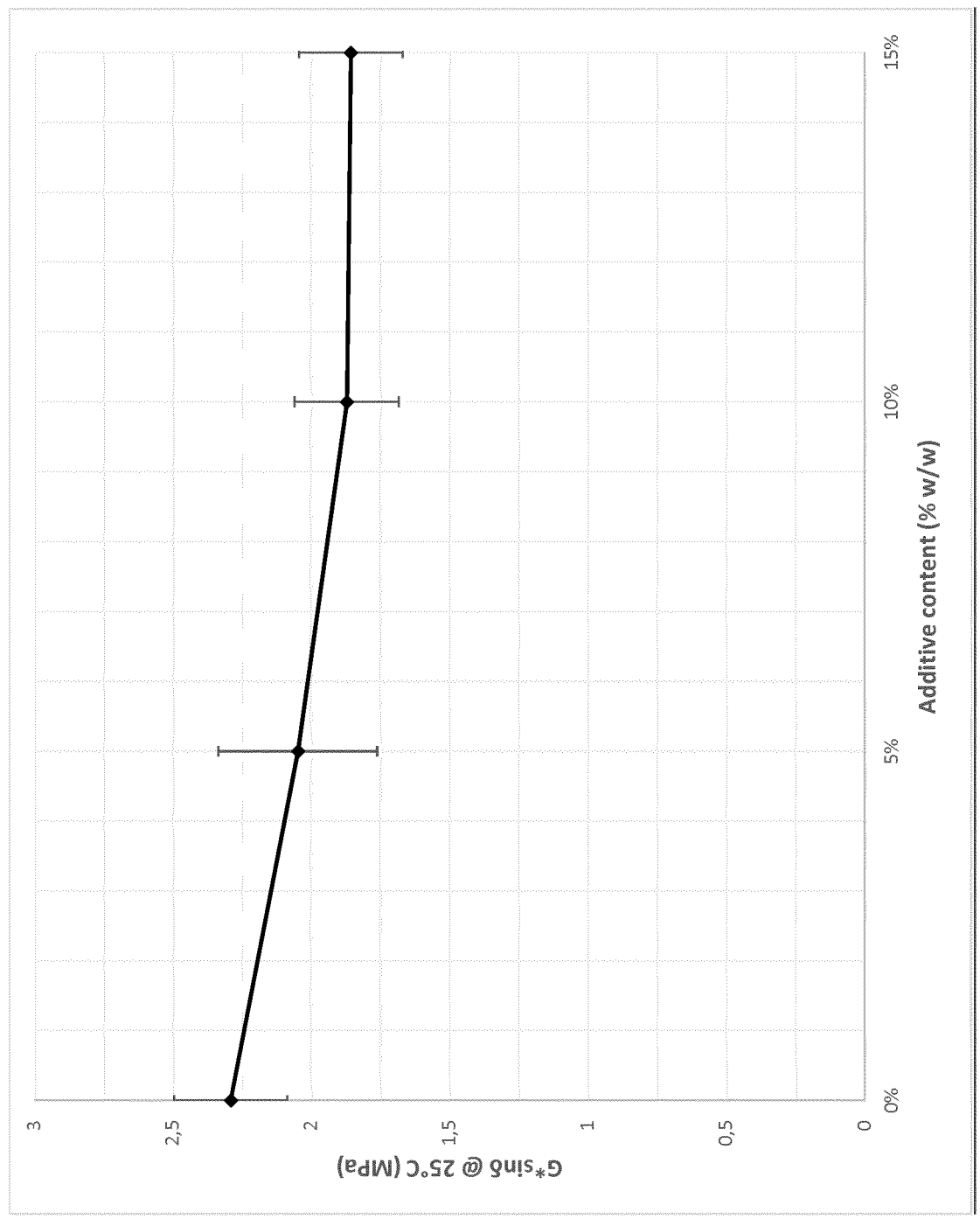
FIG. 5—Fatigue cracking parameter for bitumen with and without Renescience® Digestate Additive (from 0% to 15% by weight)

As seen in FIG. 5, the fatigue cracking parameter of bitumen showed a downward trend when increasing the content of Renescience® Digestate Additive from 0% (w/w) to 10% (w/w). Bitumen comprising 10% (w/w) and 15% (w/w) Renescience® Digestate Additive had similar fatigue cracking parameters. The lower fatigue cracking parameters for bitumen comprising Renescience® Digestate Additive indicated that the additive made bitumen less susceptible towards fatigue cracking.

Example 12—Anti-Aging Effect of Renescience® Digestate Additive in Bitumen

Aging index for long-term aged bitumen samples were calculated based on Complex Shear Modulus ($G^*$) measured by DSR using a Malvern Kinexus Pro+ according to EN 14770:2012.

$G^*$ was determined for bitumen comprising 0%, 5%, 10%, and 15%, respectively, by weight of Renescience® Digestate Additive prepared according to Example 7 and subjected to long-term (PAV) aging according to Example 9.

In the DSR measurements, frequency was 0.4 Hz, plate diameter was 8 mm, gap setting was 2.0 mm, and temperature was 25° C. Standard deviation of DSR measurements were calculated from the average difference between measurements of $G^*$ and $\delta$, respectively, at 45° C. and 50° C. using 8 mm plate and 25 mm plate, respectively.

The aging index indicates the ability of the bitumen to resist stiffening effects due to aging and was calculated as the ratio of $G^*$ for PAV-aged bitumen versus unaged bitumen:

$$G^*_{PAV\text{-}aged}/G^*_{unaged}$$

Figure 6:
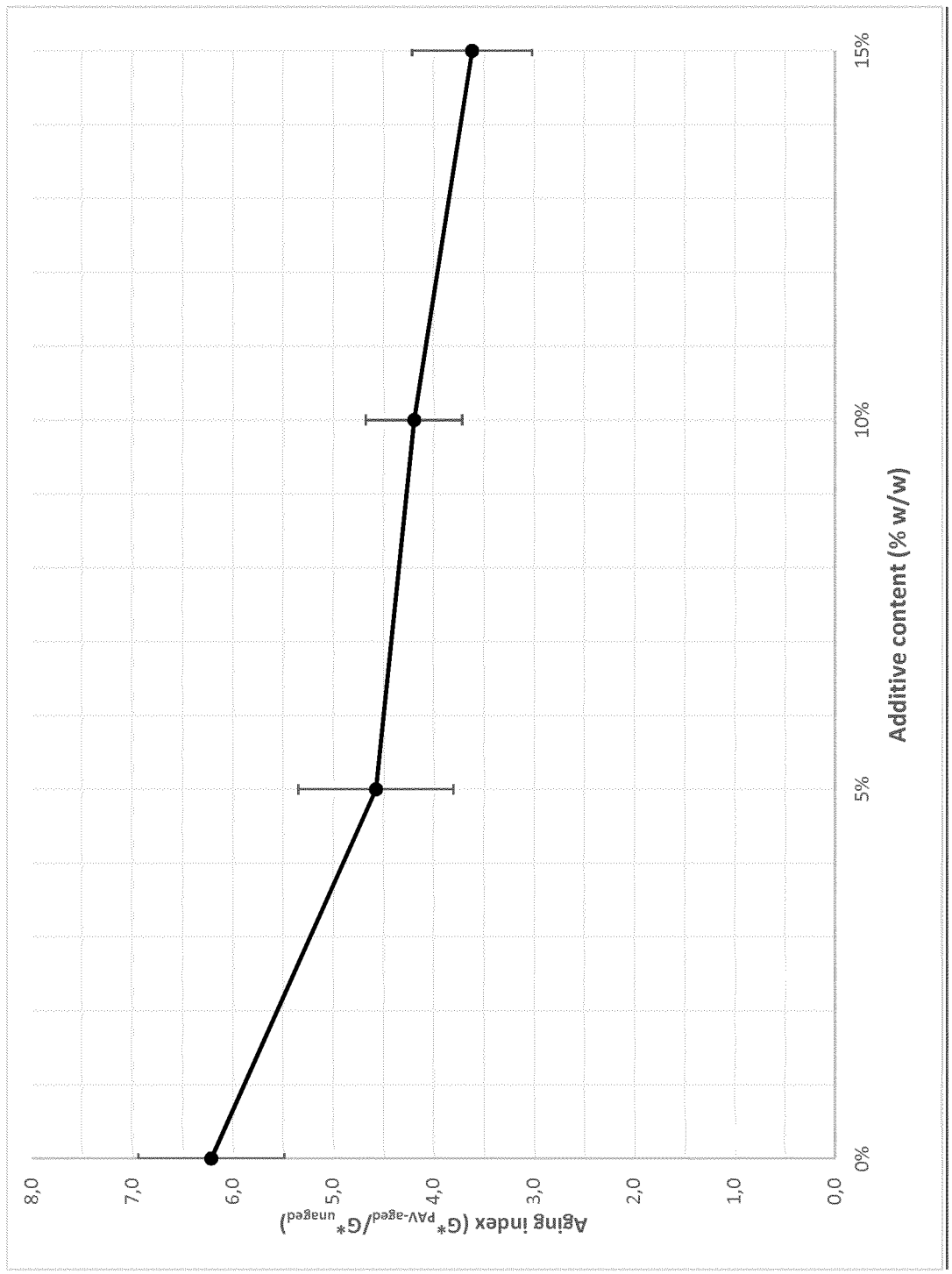
FIG. 6—Aging index for bitumen with and without Renescience® Digestate Additive (from 0% to 15% by weight)

As seen in FIG. 6, the aging index showed a decreasing trend when increasing the content of Renescience® Digestate Additive in bitumen, indicating decreased susceptibility towards stiffening effects due to aging.

REFERENCES https://www.wolfpaving.com/blog/bid/86267/The-Asphalt-Manufacturing-Process-Explained
https://en.wikipedia.org/wiki/Asphalt
https://www.wirtgen-group.com/en/technologies/new-road-construction
"Applicability of sewage sludge ash (SSA) for paving materials: A study on using SSA as filler for asphalt mixture composition and base course material: http://www.claisse.info/2013%20papers/data/e283.pdf
"Sewage sludge as raw material in asphalt mixture" Ingunza, Maria Pila et al.
"Pollution reduction and reuse of sludge waste in asphalt paving mixtures" Ziad Ghazawi et al.
https://www.sciencedirect.com/science/article/pii/S1996681416301560
European Patent Application 18156484.0: "Building materials comprising digestate"
WO2017/088892: Bitumen compositions comprising lignin
"What's in a road?—A review of the nature and uses of the different materials used in the construction and maintenance of asphalt roads", 6th edition, Asphalt Information Service and MPA Asphalt, UK

The invention claimed is:

1. An asphalt mixture composition comprising at least one of each of a binder, aggregate, and digestate additive, wherein the digestate additive is obtained from municipal solid waste, wherein the municipal solid waste is converted to digestive additive by a method comprising
   a. Subjecting municipal solid waste to combined enzymatic and microbial treatment in a bioreactor at a temperature between 20 and 75° C., wherein the microbial treatment comprises lactic acid producing bacteria;
   b. Subjecting the treated waste from a) to one or more separation steps to produce a bioliquid fraction;
   c. Subjecting the bioliquid fraction to anaerobic digestion to produce a digestate; and
   d. Drying the digestate to a moisture content of 0-20%; and
wherein the digestate additive replaces the binder up to about 0.5%, 1%, 5%, 10%, 15%, 20%, 25%, 30%, 35%, 40%, 45%, 50%, 55%, 60%, 65% or 70% by weight of the asphalt mixture composition.

2. The asphalt mixture composition according to claim 1 wherein the digestate additive comprises both solids and liquids.

3. The asphalt mixture composition according to claim 1 wherein the binder is a bituminous binder.

4. The asphalt mixture composition according to claim 1, wherein the binder is polymer modified bitumen (PmB), and wherein the binder comprises up to about 0.5%, 1%, 5%, 10%, 15%, 20%, 25%, 30%, 35%, 40%, 45%, 50%, 55%, 60%, 65% or 70% by weight of said asphalt composition.

5. The asphalt mixture composition according to claim 4, wherein the softening point of the polymer modified bitumen and the digestate additive is about 1° C. to about 10° C. higher than that of the polymer modified bitumen alone.

6. The asphalt mixture composition according to claim 1, such that when the binder comprises up to about 0.5%, 1%, 5%, 10%, 15%, 20%, 25%, 30%, 35%, 40%, 45%, 50%, 55%, 60%, 65% or 70% of digestate additive by weight of said asphalt mixture composition, said binder shows change in penetration of −80% to +80% relative to a comparable asphalt mixture composition where the binder comprises 0% of digestate additive by weight.

7. The asphalt mixture composition according to claim 1, such that when the binder comprises up to about 0.5%, 1%, 5%, 10%, 15%, 20%, 25%, 30%, 35%, 40%, 45%, 50%, 55%, 60%, 65% or 70% of digestate additive by weight of said asphalt mixture composition, said binder shows a change in softening point of between −30% to 40% relative to a comparable asphalt mixture composition where the binder comprises 0% of digestate additive by weight.

8. The asphalt mixture composition according to claim 1, said asphalt mixture composition showing a change in stiffness modulus between 5% and 400% relative to a comparable asphalt mixture composition where the binder comprises 0% of digestate additive by weight.

9. The asphalt mixture composition according to claim 1, wherein the composition shows a rut depth up to 70% lower relative to a comparable asphalt mixture composition where the binder comprises 0% of digestate additive by weight.

10. The asphalt mixture composition according to claim 1, wherein the digestate additive comprises ash.

11. The asphalt mixture composition according to claim 1, wherein the municipal solid waste is unsorted municipal solid waste.

* * * * *